US011689328B2

(12) United States Patent
Liu et al.

(10) Patent No.: US 11,689,328 B2
(45) Date of Patent: *Jun. 27, 2023

(54) SYSTEMS AND METHODS FOR ADAPTATION IN A WIRELESS NETWORK

(71) Applicant: Futurewei Technologies, Inc., Plano, TX (US)

(72) Inventors: Jialing Liu, Palatine, IL (US); Weimin Xiao, Hoffman Estates, IL (US); Qian Cheng, Naperville, IL (US)

(73) Assignee: Futurewei Technologies, Inc., Plano, TX (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/006,420

(22) Filed: Aug. 28, 2020

(65) Prior Publication Data
US 2020/0396037 A1 Dec. 17, 2020

Related U.S. Application Data

(63) Continuation of application No. 16/242,872, filed on Jan. 8, 2019, now Pat. No. 10,785,003, which is a
(Continued)

(51) Int. Cl.
*H04W 72/04* (2023.01)
*H04L 5/00* (2006.01)
(Continued)

(52) U.S. Cl.
CPC ......... *H04L 5/0048* (2013.01); *H04B 7/0478* (2013.01); *H04L 1/0003* (2013.01);
(Continued)

(58) Field of Classification Search
CPC ... H04L 1/0025; H04L 1/0003; H04L 1/0009; H04L 25/02; H04L 5/0048; H04L 5/0023;
(Continued)

(56) References Cited

U.S. PATENT DOCUMENTS

2010/0234071 A1\* 9/2010 Shabtay ................ H04B 7/155
455/562.1
2013/0114562 A1 5/2013 Seo et al.
(Continued)

FOREIGN PATENT DOCUMENTS

CN 102088762 A 6/2011
CN 103733676 A 4/2014
(Continued)

OTHER PUBLICATIONS

3GPP TS 36.211 v13.2.0, 3rd Generation Partnership Project; Technical Specification Group Radio Access Network; Evolved Universal Terrestrial Radio Access (E-UTRA); Physical channels and modulation (Release 13), Jun. 2016, pp. 1-168.
(Continued)

*Primary Examiner* — Wei Zhao
(74) *Attorney, Agent, or Firm* — Slater Matsil, LLP

(57) ABSTRACT

An embodiment method of network node operation includes indicating, by a first network node, to a first UE, a first number of REs in a first set of RBs for a first reference signal, transmitting, by the first network node, to the first UE, the first reference signal in accordance with the first number of REs and a first precoding in a first subframe, receiving, by the first network node, from the first UE, a report indicating a first MCS in accordance with a level of signal and interference measured by the first UE, wherein the measurement is restricted to the first reference signal, and transmitting, by the first network node, a first data with the indicated first MCS and the first precoding in a second subframe, the first data being transmitted on a second number of REs in the first set of RBs in the second subframe.

20 Claims, 17 Drawing Sheets

Related U.S. Application Data continuation of application No. 15/244,783, filed on Aug. 23, 2016, now Pat. No. 10,200,168.

(60) Provisional application No. 62/252,297, filed on Nov. 6, 2015, provisional application No. 62/210,690, filed on Aug. 27, 2015.

(51) Int. Cl.

| | | |
|---|---|---|
| *H04L 1/00* | (2006.01) | |
| *H04L 25/03* | (2006.01) | |
| *H04B 7/0456* | (2017.01) | |
| *H04W 72/542* | (2023.01) | |
| *H04W 72/0446* | (2023.01) | |
| *H04B 7/10* | (2017.01) | |
| *H04L 25/02* | (2006.01) | |

(52) U.S. Cl.
CPC .......... *H04L 1/0009* (2013.01); *H04L 1/0025* (2013.01); *H04L 5/006* (2013.01); *H04L 5/0023* (2013.01); *H04L 5/0044* (2013.01); *H04L 5/0051* (2013.01); *H04L 5/0091* (2013.01); *H04L 5/0094* (2013.01); *H04L 25/03* (2013.01); *H04W 72/542* (2023.01); *H04B 7/0486* (2013.01); *H04B 7/10* (2013.01); *H04L 25/0224* (2013.01); *H04W 72/0446* (2013.01)

(58) Field of Classification Search
CPC ....... H04L 6/0044; H04L 5/006; H04L 63/10; H04L 7/0478; H04B 7/0478; H04W 72/085

See application file for complete search history.

(56) References Cited

U.S. PATENT DOCUMENTS

| | | |
|---|---|---|
| 2013/0170435 A1 | 7/2013 | Dinan |
| 2013/0208604 A1 | 8/2013 | Lee et al. |
| 2013/0322276 A1 | 12/2013 | Pelletier et al. |
| 2014/0204857 A1 | 7/2014 | Mallik et al. |
| 2014/0321407 A1 | 10/2014 | Seo et al. |
| 2015/0215905 A1 | 7/2015 | Park et al. |
| 2016/0050575 A1 | 2/2016 | Seo et al. |
| 2016/0087774 A1 | 3/2016 | Guo et al. |
| 2016/0242048 A1 | 8/2016 | Pelletier et al. |
| 2016/0278077 A1* | 9/2016 | Song ................... H04W 72/042 |
| 2017/0223686 A1* | 8/2017 | You ........................ H04L 5/0048 |
| 2018/0279149 A1* | 9/2018 | Li ..................... H04W 72/0446 |

FOREIGN PATENT DOCUMENTS

| | | |
|---|---|---|
| CN | 104125186 A | 10/2014 |
| CN | 104247312 A | 12/2014 |
| CN | 104350778 A | 2/2015 |
| EP | 2509249 A1 | 10/2012 |
| WO | 2014054901 A1 | 4/2014 |
| WO | 2014056131 A1 | 4/2014 |
| WO | 2014117849 A1 | 8/2014 |
| WO | 2014182041 A1 | 11/2014 |

OTHER PUBLICATIONS

3GPP TS 36.213 v13.2.0, 3rd Generation Partnership Project; Technical Specification Group Radio Access Network; Evolved Universal Terrestrial Radio Access (E-UTRA); Physical layer procedures (Release 13), Jun. 2016, pp. 1-381.

3GPP TS 36.331 v13.2.0, 3rd Generation Partnership Project; Technical Specification Group Radio Access Network; Evolved Universal Terrestrial Radio Access (E-UTRA); Radio Resource Control (RRC); Protocol specification (Release 13), Jun. 2016, pp. 1-623.

* cited by examiner

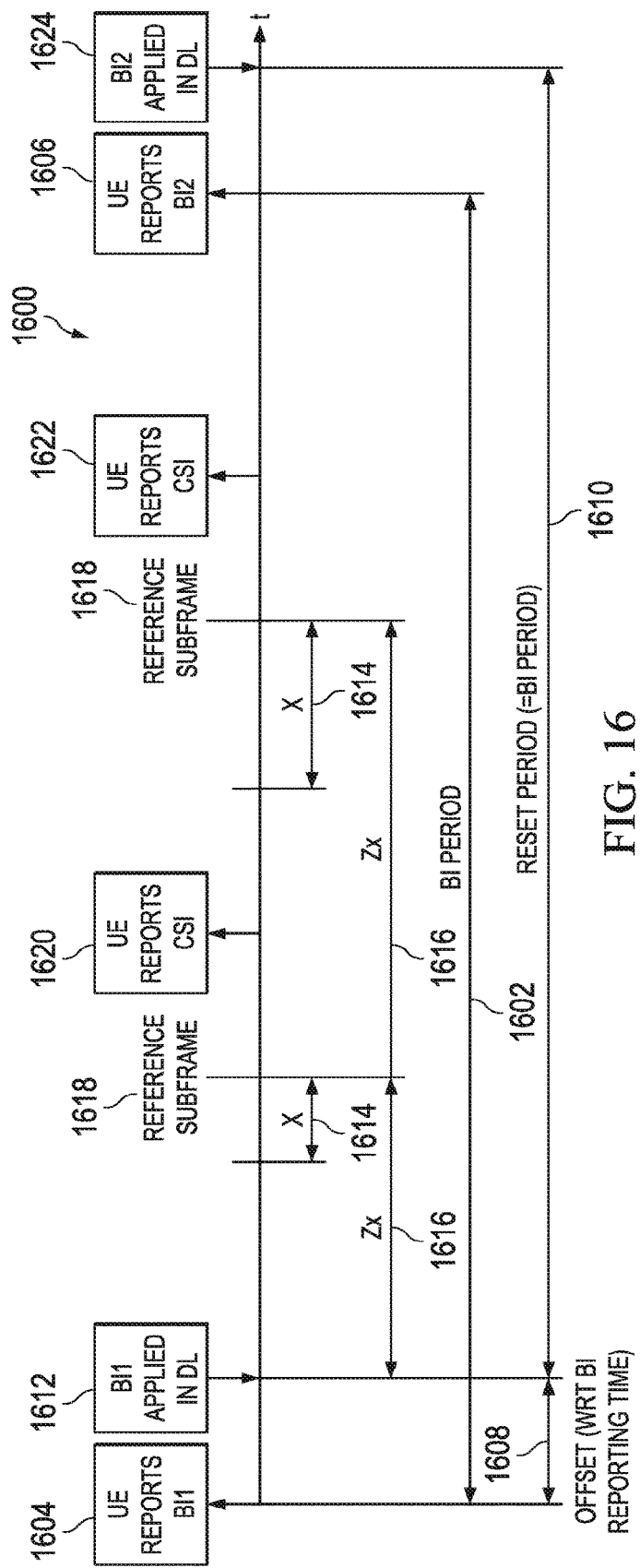
FIG. 16
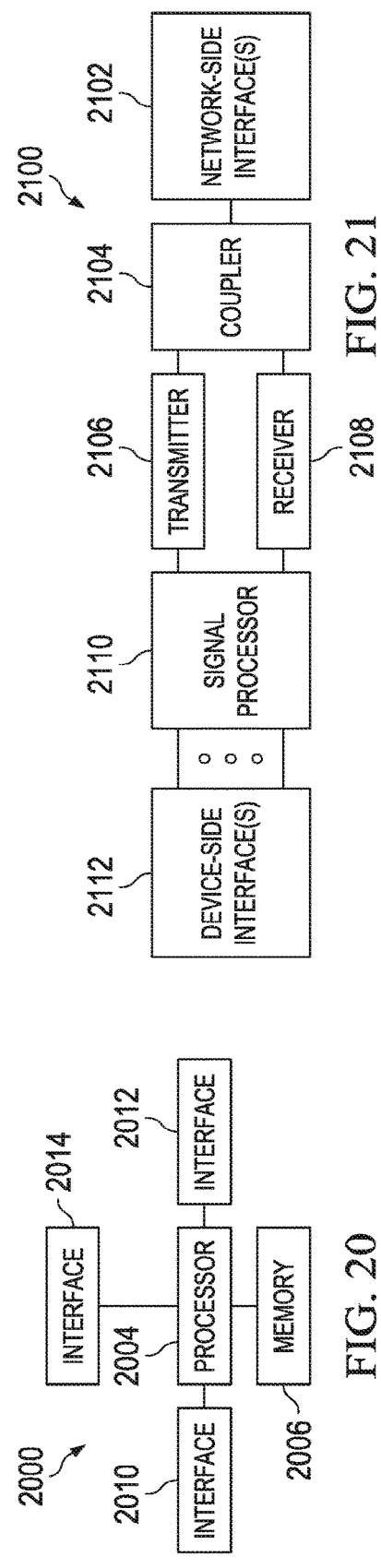
FIG. 21
FIG. 20

SYSTEMS AND METHODS FOR
ADAPTATION IN A WIRELESS NETWORK

CROSS-REFERENCE TO RELATED
APPLICATIONS

This application is a continuation of U.S. patent application Ser. No. 16/242,872, filed on Jan. 8, 2019, which is a continuation of U.S. patent application Ser. No. 15/244,783 filed on Aug. 23, 2016 (Now U.S. Pat. No. 10,200,168 issued on Feb. 5, 2019) and entitled "Systems and Methods for Adaptation in a Wireless Network," which claims the benefit of U.S. Provisional Application No. 62/210,690, filed on Aug. 27, 2015, and U.S. Provisional Application No. 62/252,297, filed on Nov. 6, 2015, which applications are hereby incorporated herein by reference.

TECHNICAL FIELD

The present invention relates to systems and methods for wireless communications, and, in particular embodiments, to systems and methods for adaptation in a wireless network.

BACKGROUND

Wireless communication systems include long term evolution (LTE), LTE-A, and LTE-A-beyond systems. A modern wireless communications system may include a plurality of NodeBs (NBs), which may also be referred to as base stations, network nodes, communications controllers, or eNBs (enhanced NBs), and so on, and which may even include network points using different radio access technologies (RATs) such as high speed packet access (HSPA) NBs and WiFi access points. A NodeB may be associated with a point or multiple points, and a cell may include a point or multiple points, with each point having a single or multiple antennas. A point may also correspond to multiple cells operating in multiple component carriers. The eNBs are interconnected with each other by means of an X2 interface. The eNBs are also connected by means of an S1 interface to a Mobility Management Entity (MME) and to a Serving Gateway (S-GW). Additionally, a cell or NB may be serving a number of users (also commonly referred to as User Equipment (UE), mobile stations, terminals, devices, and so forth) over a period of time.

Generally speaking, in orthogonal frequency division multiplexing (OFDM) systems, the frequency bandwidth of the system is divided into multiple subcarriers in the frequency domain. In the time domain, one subframe is divided into multiple OFDM symbols. The OFDM symbol may have a cyclic prefix to avoid the inter-symbol interference caused by multi-path delays. One resource element (RE) is defined by the time/frequency resource within one subcarrier and one OFDM symbol. In a downlink transmission, reference signals (RSs) and other signals such as a data channel (physical downlink shared channel (PDSCH)), a control channel (physical downlink control channel (PDCCH)), and an enhanced PDCCH (EPDCCH) are orthogonal and multiplexed in different resource elements in the time/frequency domain. In an uplink transmission, physical uplink shared channel (PUSCH) and physical uplink control channel (PUCCH) are orthogonal and multiplexed in different time/frequency resources. A set of REs are grouped together to form a resource block (RB). For example, 12 subcarriers in a slot make up a RB.

Generally, to enable any data channels in either uplink (UL) or downlink (DL) transmissions such as PDSCH or PUSCH of an LTE-A system, reference signals are transmitted. There are reference signals for a UE to perform channel/signal estimation/measurements for demodulation of PDCCH and other common channels as well as for some measurements and feedback, which is the Common/Cell-specific Reference Signal (CRS) inherited from the Release 8/9 specification of Evolved Universal Terrestrial Radio Access (E-UTRA). A Dedicated/Demodulation Reference Signal (DMRS) can be transmitted together with the PDSCH channel in Release 10 of E-UTRA. DMRS is used for channel estimation during PDSCH demodulation. In Release 10, the Channel State Information Reference Signal (CSI-RS) is introduced in addition to CRS and DMRS. CSI-RS is used for Release 10 UEs to measure the channel status, especially for multiple antennas cases. PMI/CQI/RI and other feedback information may be based on the measurement of CSI-RS for Release 10 and beyond UEs. PMI is the precoding matrix indicator, CQI is the channel quantity indicator, and RI is the rank indicator of the precoding matrix. CSI-RS in Release 10 can support up to 8 transmission antennas while CRS can only support a maximum of 4 transmission antennas in Release 8/9. The number of CSI-RS antenna ports can be 1, 2, 4, or 8. In addition, to support the same number of antenna ports, CSI-RS has much lower overhead due to its low density in time and frequency.

A heterogeneous network (HetNet) comprises high power macro points and various lower power points that generally may share the same communication resources. The lower power points may include, but are not limited to, picos, micros, remote radio heads (RRHs), femtos (or home eNBs (HeNBs)), access points (APs), distributed antennas (DAs), relays, and near field communication points.

A network also may comprise several component carriers operating in different frequency bands. High frequency bands generally have a high pathloss over distance so they are more suitable to serve a relatively smaller area, such as being used for high throughput purposes for nearby UEs. Low frequency bands generally have low pathloss over distance so they are more suitable to serve a relatively large area, such as being used for providing coverage.

SUMMARY

An embodiment method of network node operation includes indicating, by a first network node, to a first user equipment (UE), a first number of resource elements (REs) in a first set of resource blocks (RBs) for a first reference signal, transmitting, by the first network node, to the first UE, the first reference signal in accordance with the first number of REs and a first precoding in a first subframe, receiving, by the first network node, from the first UE, a report indicating a first modulation and coding scheme (MCS) in accordance with a level of signal and interference measured by the first UE, wherein the measurement is restricted to the first reference signal, and transmitting, by the first network node, a first data with the indicated first MCS and the first precoding in a second subframe, the first data being transmitted on a second number of REs in the first set of RBs in the second subframe.

An embodiment network node includes a processor and a non-transitory computer readable storage medium storing programming for execution by the processor. The programming includes instructions to indicate, to a first UE, a first number of REs in a first set of RBs for a first reference signal, transmit, to the first UE, the first reference signal in accordance with the first number of REs and a first precoding in a first subframe, receive, from the first UE, a report indicating a first MCS in accordance with a level of signal and interference measured by the first UE, wherein the measurement is restricted to the first reference signal, and transmit a first data with the indicated first MCS and the first precoding in a second subframe, the first data being transmitted on a second number of REs in the first set of RBs in the second subframe.

An embodiment method of UE operation includes receiving, by a UE, a reference signal in a set of RBs, wherein a number of resource elements occupied by the reference signal is less than all of the resource elements in a subframe, measuring, by the UE, a level of signal and interference on the reference signal, determining, by the UE, an MCS in accordance with the level of signal and interference, and transmitting, by the UE, a report indicating the determined MCS.

An embodiment UE includes a processor and a non-transitory computer readable storage medium storing programming for execution by the processor. The programming includes instructions to receive a reference signal in a set of RBs, wherein a number of resource elements occupied by the reference signal is less than all of the resource elements in a subframe, measure a level of signal and interference on the reference signal, determine an MCS in accordance with the level of signal and interference, and transmit a report indicating the determined MCS.

An embodiment method for wireless communications includes sending, by a user equipment (UE), a channel state information (CSI) report to a network device. The CSI report includes a channel measurement associated with a first subset of a set of non-zero-power (NZP) CSI reference signal (CSI-RS) (NZP CSI-RS) resources and an interference measurement associated with at least one of a set of resources configured for interference measurement for the CSI report and the first subset of the set of NZP CSI-RS resources. In one example, the CSI report includes a channel quality indicator (CQI) but not a precoding matrix indicator (PMI). In the same example, or in another example, the set of resources configured for interference measurement include at least a set of CSI interference measurement (CSI-IM) resources. In any one of the abovementioned examples, or in a new example, the method further includes receiving, by the UE, a configuration of measurement restriction associated with the channel measurement. In any one of the abovementioned examples, or in a new example, the method further includes receiving a configuration of measurement restriction associated with interference measurement. In any one of the abovementioned examples, or in a new example, the method further includes receiving, by the UE, a downlink control information (DCI) message indicating the first subset of the NZP CSI-RS resources. In any one of the abovementioned examples, or in a new example, the method further includes receiving, by the UE, a downlink control information (DCI) message indicating the set of resources configured for interference measurement for the CSI report. In any one of the abovementioned examples, or in a new example, the CSI report is associated with a designation of a rank associated with the first subset of the NZP CSI-RS resources, and the rank is for a number of layers/ports associated with the first subset of the NZP CSI-RS resources. In any one of the abovementioned examples, or in a new example, the CSI report is associated with a rank indicator (RI) report with a rank, and the rank is equal to a number of selected layers/ports within the first subset of the NZP CSI-RS resources. In any one of the abovementioned examples, or in a new example, the CSI report is associated with a designation of an uplink channel on which the UE is to transmit the report. In any one of the abovementioned examples, or in a new example, the CSI report is associated with a designation of an amount of bundling of RBs to be used by the network device to transmit a first reference signal (RS) on the first subset of the NZP CSI-RS resources. In any one of the abovementioned examples, or in a new example, a signaling for the interference measurement includes at least one of a sequence and layers/ports for interference measurement by the UE. In such an example, at least one of a sequence and layers/ports for interference measurement by the UE corresponds to a second subset of a set of NZP CSI-RS resources specified for a second UE for channel measurement.

An embodiment method for wireless communications includes receiving, by a network device, a channel state information (CSI) report to a user equipment (UE). The CSI report includes a channel measurement associated with a first subset of a set of non-zero-power (NZP) CSI reference signal (CSI-RS) (NZP CSI-RS) resources and an interference measurement associated with at least one of a set of resources configured for interference measurement for the CSI report and the first subset of the set of NZP CSI-RS resources. In one example, the CSI report includes a channel quality indicator (CQI) but not a precoding matrix indicator (PMI). In the same example, or in another example, the set of resources configured for interference measurement include at least a set of CSI interference measurement (CSI-IM) resources. In any one of the abovementioned examples, or in a new example, the method further includes transmitting, by the network device, a configuration of measurement restriction associated with the channel measurement to the UE. In any one of the abovementioned examples, or in a new example, the method further includes transmitting, by the network device, a configuration of measurement restriction associated with interference measurement to the UE. In any one of the abovementioned examples, or in a new example, the method further includes transmitting, by the network device, a downlink control information (DCI) message to the UE that indicates the first subset of the NZP CSI-RS resources. In any one of the abovementioned examples, or in a new example, the method further includes transmitting, by the network device, a downlink control information (DCI) message to the UE that indicates the set of resources configured for interference measurement for the CSI report. In any one of the abovementioned examples, or in a new example, the CSI report is associated with a designation of a rank associated with the first subset of the NZP CSI-RS resources, and the rank is for a number of layers/ports associated with the first subset of the NZP CSI-RS resources. In any one of the abovementioned examples, or in a new example, the CSI report is associated with a rank indicator (RI) report with a rank, and the rank is equal to a number of selected layers/ports within the first subset of the NZP CSI-RS resources. In any one of the abovementioned examples, or in a new example, the CSI report is associated with a designation of an uplink channel on which the UE is to transmit the report. In any one of the abovementioned examples, or in a new example, the CSI report is associated with a designation of an amount of bundling of RBs to be used by the network device to transmit a first reference signal (RS) on the first subset of the NZP CSI-RS resources. In any one of the abovementioned examples, or in a new example, a signaling for the interference measurement includes at least one of a sequence and layers/ports for interference measurement by the UE. In such an example, at least one of a sequence and layers/ports for interference measurement by the UE corresponds to a second subset of a set of NZP CSI-RS resources specified for a second UE for channel measurement.

BRIEF DESCRIPTION OF THE DRAWINGS

For a more complete understanding of the present invention, and the advantages thereof, reference is now made to the following descriptions taken in conjunction with the accompanying drawings, in which:

FIG. 16 illustrates an example of Alt3 from a UE point of view;

FIG. 20 illustrates a block diagram of an embodiment processing system for performing methods described herein; and FIG. 21 illustrates a block diagram of a transceiver adapted to transmit and receive signaling over a telecommunications network.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are motivated by a few issues emerging from wireless networks as detailed below. A network point in a wireless network may be turned on or off based on traffic demand, energy constraints, emission constraints, quality of service (QoS) constraints, or interference management purposes. One embodiment solution for handling such an event is based on UL Transition Request Signals (TRS) sent by a group of UEs so that the network can determine whether it is beneficial to turn on a turned-off network point. In an example shown in system 100 in FIG. 1, if it is decided that Pico2 102 is to be turned on or off, UE1 104 and UE2 106, which are both are in the Pico2 102 coverage area, may be affected, as well as UE3 108, which is not in the Pico2 102 coverage area but is not far from Pico2 102. UE1 104 and UE2 106 may be configured to measure and report Pico2's RS and may hand over to Pico2 102. That is, UE1 104 and UE2 106 may need to be reconfigured. UE3 108 may see increased PDSCH interference, which may be statistically or qualitatively different from the interference previously seen. Namely, this increased interference seen by UE3 108 may not be due to the normal fluctuations of interference, but rather may signify a sudden change of UE3's interference condition, which may entail special handling. UE3 108 channel state information (CSI) (CQI/PMI/RI) and radio resource management (RRM)/radio link monitoring (RLM) measurement processes and reports may need to be changed or reconfigured. The network may need to adjust or fine tune parameters before, during, and/or after the transition. The network may need to evaluate the impact of network reconfiguration. Further, the network may need to send reconfiguration signals to a UE and/or an eNB to facilitate UE reconfiguration. In general, when a configuration of a network point or carrier undergoes a transition, the transition may affect multiple other points or carriers and multiple UEs such that the points, carriers, or UEs may need to reconfigured. A procedure to prepare for, support, and handle the transition and reconfiguration may be desirable.

Figure 2:
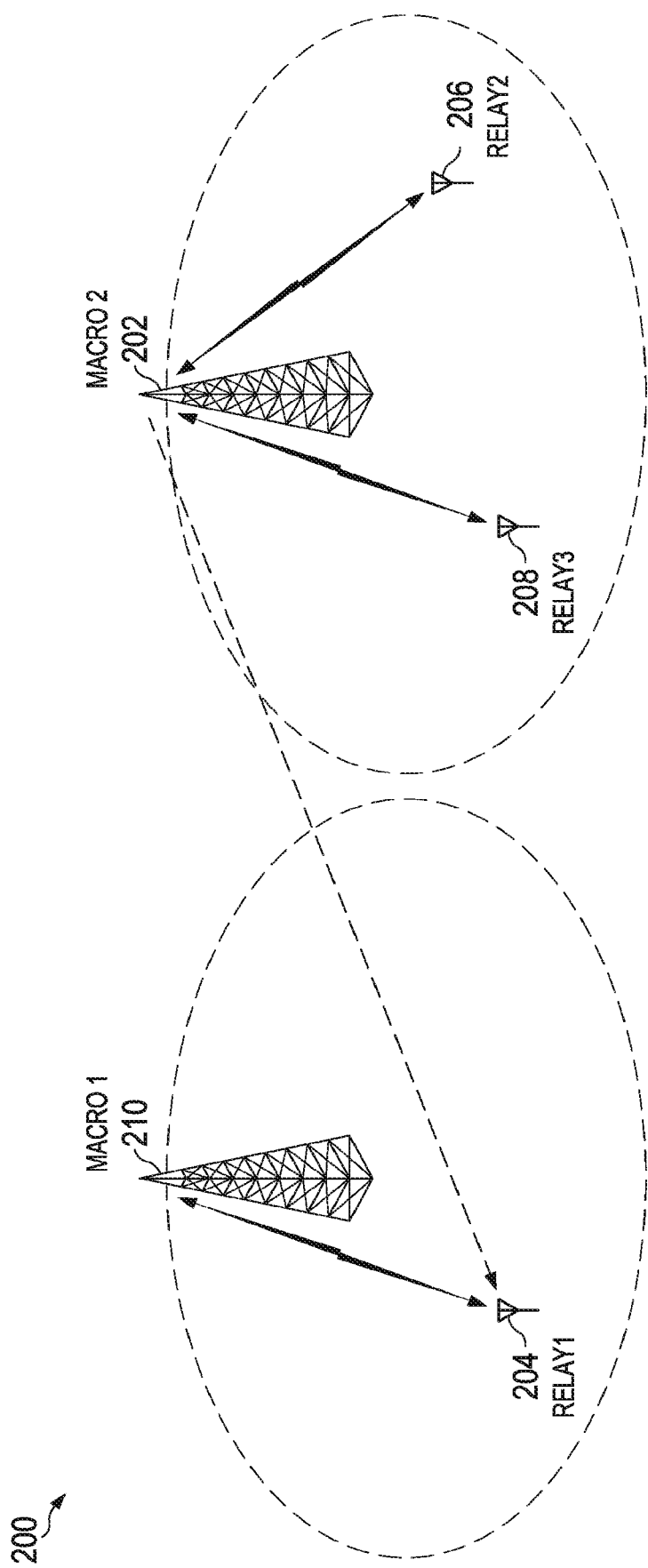
FIG. 2 illustrates interference from an eNB to a relay.

In an example shown in system 200 in FIG. 2, interference by Macro2 202 to reception by Relay1 204 may increase if Macro2 202 changes its backhaul transmission (Tx) activities. For example, interference may increase if the precoding by Macro2 202 drifts beyond a threshold after some time, if backhaul Tx turns on or off due to traffic pattern changes, or if Macro2 202 switches from Tx to Relay2 206 to Tx to Relay3 208 due to traffic pattern changes or other changes. These are examples of the network experiencing a transition which may lead to a chain reaction to multiple network nodes (e.g., multiple network nodes seeing sudden interference condition changes) for a period of time. As a result of, or in anticipation of, the interference jump, Macro1 210 may adjust its transmission to Relay1 204. This adjustment may further cause changes of interference from Macro1 210 to other Macro transmissions. For example, Macro2 202 may need to further adjust (i.e., fine tune) its transmission to Relay2 206 and/or Relay3 208. This chain reaction of sudden interference jumps may lead the network to adjust its configurations for a period of time. The effect of the adjustments may be difficult to predict unless the adjustments are actually put into test in the network. Therefore, an efficient way to support the adjustments without significantly affecting normal data transmissions may be desirable.

As another example, algorithms and procedures proposed for network optimization may be based on iterations among multiple network nodes, and sometimes multiple UEs are also involved. One case involves the joint optimization of cell attachment and resource allocation, which is difficult to carry out in general and is usually done suboptimally in an iterative fashion. A suboptimal solution may assume a fixed cell attachment, and then a presumed optimal resource allocation for the given cell attachment may be computed. The given resource allocation may be assumed, and the cell attachment may be further updated, and these procedures may be iterated until optimization is achieved or for some maximum number of iterations. Such iterations, however, can lead to complexity and unwanted fluctuations that are not desirable for data (e.g., PDSCH) transmissions. For instance, sometimes such an iterative algorithm may not generate the desired performance or behavior in a number of iterations. The network configuration obtained after several iterations may be discarded in such a case, and the network may revert back to the original network configuration. When this situation occurs, the normal data transmissions between multiple network nodes and multiple UEs may be significantly affected. Therefore, it may be desirable to separate the resources and processes for normal data transmission from the iterative probing, optimization, reconfiguration, and adjustment actions. When the iteration achieves convergence on the probing resources with the desired or acceptable performance or behavior, the attained configurations may then be applied to PDSCH transmissions.

The above and similar issues may be summarized as follows. A network component may often adapt its activity or go through transitions. For example, a network node, carrier, or antenna set in an activity level (e.g., with reduced transmission power) or a state (e.g., a dormant state) may need to transition to a different activity level (e.g., with full transmission power) or a different state (e.g., an active state) when traffic, interference, or other conditions change. As an example, a dormant node may be turned on when UEs enter its coverage range. The reconfiguration of a first network node will affect a number of network nodes and UEs, including the first node itself, thus generating transient dynamics for a period of time. The impact of the transition or adaptation may be evaluated by multiple nodes and/or UEs before, during, and/or after the transition or adaptation takes place. The procedure may iterate, where the network and UEs further adjust or fine tune their configurations. When a network node experiences or foresees a transition, the node may signal its UEs and other nodes regarding the transition so that the UEs and other nodes may know when to further adapt. Several aspects of this general procedure are described below.

Interference Jump and Reconfiguration Signal to UE

Figure 1:
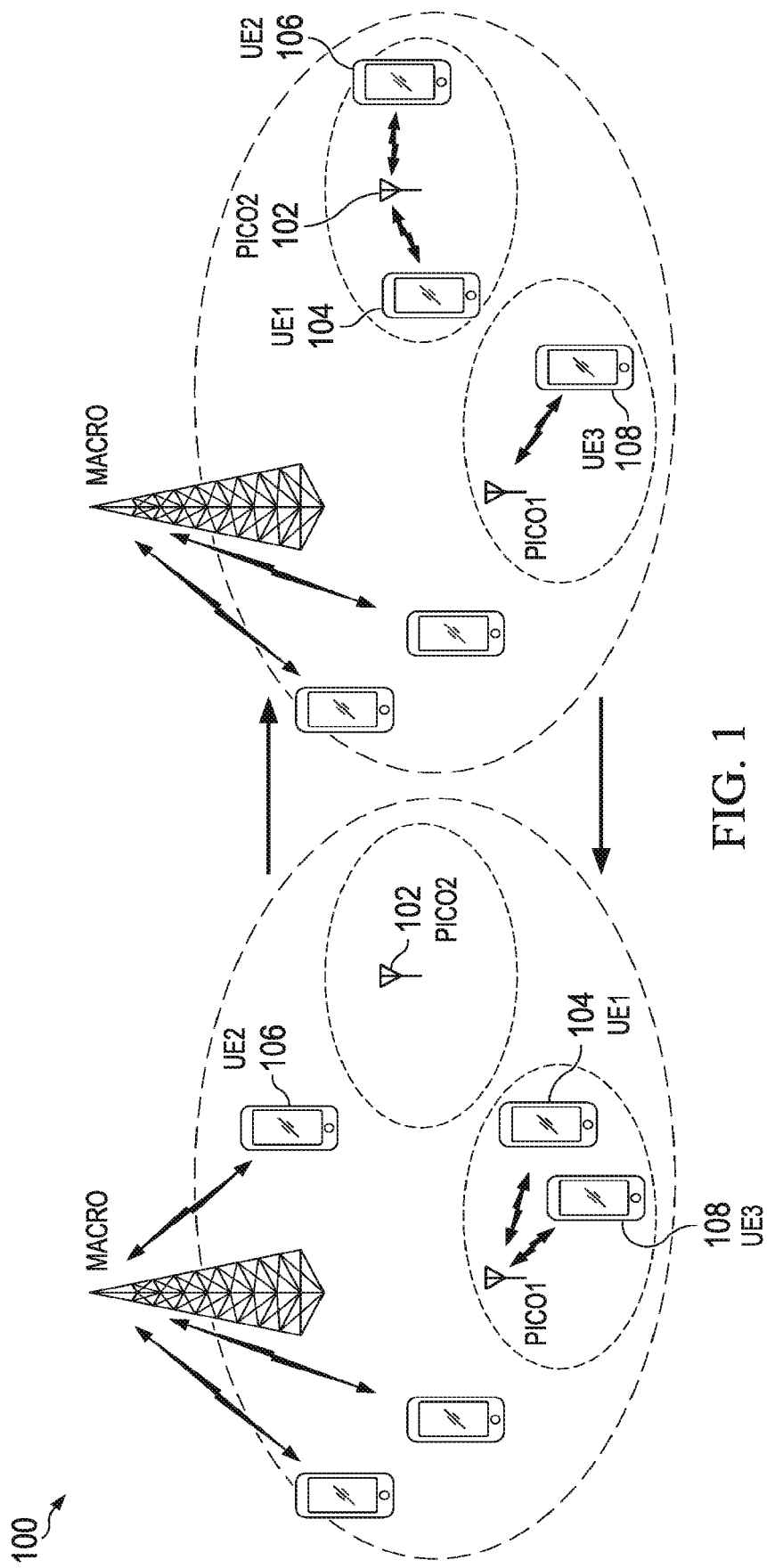
FIG. 1 illustrates the turning on/off of a network point.

In FIG. 1, when Pico2 102 starts to Tx PDSCH at time t, UE3 108 may see increased PDSCH interference statistically or qualitatively different from before. This interference condition change is different from normal interference fluctuations. Typically UE3 108 performs layer 1 filtering for its CQI, interference, Reference Signal Received Quality (RSRQ), etc. For example, $I_t = fI_{t-1} + (1-f)i_{t-1}$ may be used for interference filtering, where $i_{t-1}$ is the instantaneous measurement at time t−1, and $I_{t-1}$ is the filtered measurement at time t−1, and f is the filter constant, normally 0.7-0.99. It may take a while for the filter to converge to the new interference condition, and especially so if the interference measurement is based on CSI-IM (CSI interference measurement) resources, which are sparse in time.

For example, if the filter constant f=0.9, then the filter time constant is 9.5 samples. It takes 2~3 times of the time constant for the filter to settle to 85%~95% of new filtered values. That is, CRS-based interference measurements take about 19 milliseconds (ms) to 28 ms to settle. Similar computation can show that CSI-IM resource-based measurements take about 95 ms to 142 ms to settle if the CSI-IM resource has a period of 5 ms, i.e., once in 5 ms. The CSI-IM resource-based measurements take about 190 ms to 285 ms (or 380 ms to 570 ms, or 760 ms to 1140 ms, respectively) to settle if the CSI-IM resource has a period of 10 ms (or 20 ms, or 40 ms, respectively). These will cause the network to respond slowly to the interference jump, and the long transient period may see some degradation of user experience. In particular, CQI/PMI/RI feedback and/or RSRQ measurements may be affected, causing mismatches in CQI and RSRQ, and hence the transmission to the UE may become less efficient. A smaller filter constant f may be chosen to reduce the latency, but sensitivity to normal fluctuations may be too great if the smaller filter constant is used. Therefore, a reconfiguration signal sent by the network to a UE to notify the UE of a change of measurement conditions may facilitate UE reconfiguration and network operations. For example, the UE may reset its filter state upon receiving the signal (e.g., the UE may restart the CSI-IM resource-based measurement process), or the UE may adjust its filter constant to a smaller value. If the UE is signaled to adjust its filter constant to a smaller value, the UE may receive another signal later indicating the completion of the transition or reconfiguration, and the UE may adjust its filter to the original value. In other words, the network may use reconfiguration signals to configure the UE to adapt the filter according to environment changes.

A UE performs layer 3 filtering for Reference Signal Received Power (RSRP) and RSRQ (Received Signal Strength Indicator (RSSI)). RSRP layer 3 filtering may not need to be reset when an interference condition changes, but the performance in terms of accuracy may be affected when an interference condition changes. For example, when the interference level is normal, RSRP accuracy may be at a first level. When the interference jumps to a much higher level, RSRP accuracy may degrade to a second level. It may be useful for the network and UE to know and incorporate the performance changes due to network condition changes, so that the UE may adapt its RSRP estimate and filtering according to interference condition changes. Alternatively, RSRQ layer 3 filtering may need to be reset when an interference condition changes. A typical input period to layer 3 filtering is 40 ms, and a default time constant is about 1.5 input sample durations, so 2~3 times of the time constant is about 3~4 input sample durations (about 120 ms to 160 ms). Therefore, if the interference condition takes a sudden jump at a time close to the RSRQ/RSSI reporting time, then the reported RSRQ/RSSI may not reflect the actual interference condition. To facilitate the process, a signal to indicate the reset or reconfiguration may be used. If a reset is needed in layer 3 operations, a rule may be created wherein, upon receiving a reconfiguration signal, the UE resets its layer 3 filter or temporarily adjusts its filter coefficient.

The abovementioned layer 3-related values may be computed based on Third Generation Partnership Project (3GPP) Technical Specification (TS) 36.331, which is hereby incorporated herein by reference in its entirety. In TS 36.331, the information element (IE) FilterCoefficient specifies the measurement filtering coefficient. Value fc0 corresponds to k=0, fc1 corresponds to k=1, and so on.

FilterCoefficient information element

```
-- ASN1START
    FilterCoefficient :: =    ENUMERATED {  fc0, fc1, fc2, fc3, fc4, fc5,fc6, fc7, fc8,
fc9, fc11, fc13, fc15, fc17, fc19, spare1, ...}
    -- ASN1STOP
```

| FilterCoefficient information element | | |
|---|---|---|
| QuantityConfigEUTRA ::= | | SEQUENCE { |
| filterCoefficientRSRP | FilterCoefficient | DEFAULT fc4, |
| filterCoefficientRSRQ | FilterCoefficient | DEFAULT fc4}. |

The measured result is filtered, before being used for evaluation of reporting criteria or for measurement reporting, by the following formula:

$$F_n = (1-a) \cdot F_{n-1} + a \cdot M_n$$

where $M_n$ is the latest received measurement result from the physical layer;

$F_n$ is the updated filtered measurement result that is used for evaluation of reporting criteria or for measurement reporting;

$F_{n-1}$ is the old filtered measurement result, where $F_0$ is set to $M_1$ when the first measurement result from the physical layer is received; and $a = \frac{1}{2}^{(k/4)}$, where k is the filterCoeffcient for the corresponding measurement quantity received by the quantityConfig.

The filter is adapted such that the time characteristics of the filter are preserved at different input rates, observing that the filterCoefficent k assumes a sample rate equal to 200 ms.

Thus, a UE may adapt estimation and/or filtering characteristics based on the received reconfiguration signals. Alternatively, since the network has information about the UE's RSRQ/RSSI estimation, filtering, and/or reporting configurations, the network may coordinate the network components so that a sudden interference change can occur only at certain times depending on the timing of the RSRQ/RSSI estimation, filtering, and/or reporting. For example, the network may allow a node to be turned on or off only at a fixed offset from the 200 ms-period RSRQ/RSSI reporting or during a specified time interval different from the RSRQ/RSSI reporting.

An eNB may send a network reconfiguration signal to a UE with a specific timing and associated with a CSI process configuration, CSI-RS resource configuration, and/or CSI-IM resource configuration. UEs very close to the node that made the transition are likely to be configured to receive CSI-RS from that node. UEs very far from the node that made the transition are likely not to be affected by the transition. UEs in between may need some reconfiguration. Upon reception of the reconfiguration signal, UE actions may include resetting filter states for interference estimation, CSI measurements, and RSRQ measurements, and adjusting estimation and/or filtering parameters to adapt to an interference condition change. UEs may also start a new signal or interference measurement process, stop a signal or interference measurement process, perform handover to another point or carrier, etc.

If an eNB does not send a network reconfiguration signal to a UE to initiate a reconfiguration, the UE may assume a reconfiguration is needed when its CSI-RS resources or CSI-IM resources or CSI processes (e.g., for a coordinated multipoint (CoMP) set) are reconfigured, such as modified, removed, or added. Generally, if a goal is to restart the measurement process on the same resources, then reconfiguring a CSI process, CSI-RS resource, and CSI-IM resource to achieve that purpose may lead to higher overhead than sending a reconfiguration signal, which may achieve the same purpose. However, if there is a timing pattern for the restart of the measurement process, a timing window may be signaled or defined so that the UE can restart the measurement process at the end of each timing window.

In addition to the overhead concern mentioned above, problems may arise if a UE attempts to interpret a signal as a measurement reset signal or a filter reconfiguration signal. In other words, there may be situations where an explicit measurement reset signal or filter reconfiguration signal is desirable. For example, for some UEs, using the CSI-RS resource configuration change signal, or CSI-IM resource configuration change signal, or CSI process configuration change signal, as a network reconfiguration signal may cause problems. If a UE moves, its CSI-RS resources may naturally update, and its interference condition may not have any abrupt change, so there may not be always a need to reset its measurement process or reconfigure the filtering parameters and so on, even if the UE's CSI-RS resource configuration is updated. A neighboring UE may not experience any CSI-RS resource change, but may still experience significant interference condition change when a network transition occurs. Therefore, there exist cases in which the configuration of CSI-RS resources, or CSI-IM resources, or CSI processes may be updated, but in which there is no need for the measurement process to be reset or the filter to be reconfigured. There may also be cases in which the CSI-RS resources, and CSI-IM resources, and CSI processes are not updated, but in which there may be a need for the measurement process to be reset or the filter to be reconfigured.

Figure 3:
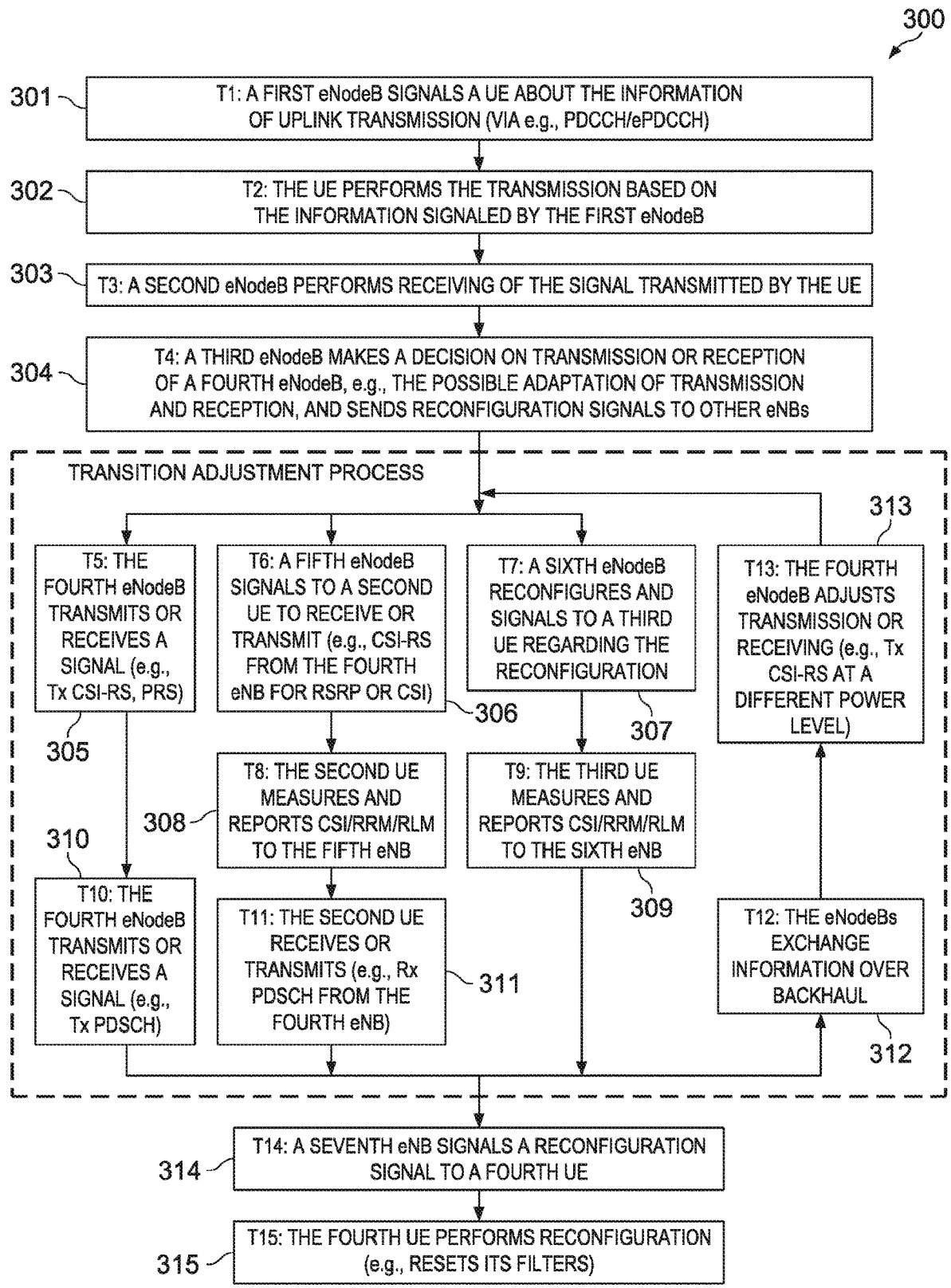
FIG. 3 illustrates a transition adjustment period flow diagram.

The reconfiguration signal may not be the same as the transition decision signal (see the signal in Step 304 of FIG. 3). For example, the transition decision signal may turn on only CRS/CSI-RS transmissions. Whether there will be PDSCH transmissions (which may lead to more interference than RS transmissions alone) may depend on other factors such as CSI feedback and scheduling. An eNB may send the reconfiguration signal if the eNB changes its PDSCH activity levels significantly, such as turning on PDSCH based on UE CSI feedback. In other words, the transition decision and the sudden interference jump may occur at different times, despite there being some connection between the transition decision and the sudden interference jump. Separating the reconfiguration signal from the transition decision signal may also prevent system oscillation. For example, after an eNB's transition from the dormant state to the active state, the eNB may receive UE measurement feedback reports and may decide not to serve the UEs and may even turn off. In such a case, the neighboring eNBs may not need to signal their UEs for reconfiguration, and neighboring UEs may not need to reset their filters. The reconfiguration signal may be signaled by an upper layer or in the PDCCH or EPDCCH or in a common channel. Timing information may also be sent with the reconfiguration signal to indicate when the reconfiguration will be in effect.

Transition Adjustment Period

A network component may often adapt its activity or go through transitions. When a network node experiences or foresees a transition, the node may signal its UEs and other nodes regarding the transition so that the UEs and other nodes may know when and how to adapt. This signaling may trigger transient dynamics for a period of time called the Transition Adjustment Period, some procedures of which are described in detail below.

An eNB may send a network reconfiguration signal to neighboring eNBs. Upon reception of the reconfiguration signal, the neighboring eNBs' actions may include reconfiguring their UEs for CSI-RS resources, CSI-IM resources, and/or CSI processes, receiving their UE CSI/RRM/RLM reports, and changing their transmissions/receptions and/or their UE associations/configurations. The effect of an eNB having made the transition is evaluated by the network. The eNBs further adjust their transmissions/receptions and their UE associations/configurations until convergence occurs or according to one or more exit rules.

A transition at an eNB may cause multiple eNBs to further adjust their transmissions/receptions and their UE associations/configurations until convergence occurs. The above-described steps may form a procedure for the network to adjust or fine tune after a transition, and this procedure may be referred to as a Transition Adjustment Process. A set of eNBs and UEs may need to be informed about this process. The process may be performed on a specific subset of resources (e.g., probing resources, as described below) or on all relevant resources. Whether the process is performed on probing resources only (which may be a subset of time/frequency resources), or on a larger scale of resources, may be indicated in the reconfiguration signal.

FIG. 3 illustrates a block diagram of Transition Adjustment Process operations 300. In step 301, a first eNB signals a UE about the information of an uplink transmission (via, e.g., PDCCH or EPDCCH). In step 302, the UE performs the transmission based on the information signaled by the first eNB. In step 303, a second eNB performs receiving of the signal transmitted by the UE. In step 304, a third eNB makes a decision on transmission or reception of a fourth eNB, e.g., the possible adaptation of transmission and reception, and sends reconfiguration signals to other eNBs.

As part of the Transition Adjustment Process, in step 305, the fourth eNB transmits or receives a signal (e.g., Tx CSI-RS, a positioning reference signal (PRS), or other reference signals). In other words, the fourth eNB may be a turned-off eNB that is starting to turn on, or more generally, the fourth eNB may be a network entity going through a transition such as on/off, power adaptation, carrier adaptation, or carrier type adaptation. In step 310 (generally at the end of the Transition Adjustment Process), the fourth eNB transmits or receives a signal (e.g., Tx PDSCH or other data carrying signals). That is, the fourth eNB may start to serve UEs and engage in data communications, and the transition involving the fourth eNB may be complete.

In step 306, which may be done in parallel to step 305, a fifth eNB signals to a second UE to receive or transmit (e.g., CSI-RS from the fourth eNB, which has been transmitted starting in step 305, for RRM (RSRP/RSRQ) or CSI measurements). In step 308, the second UE measures and reports CSI/RRM/RLM to the fifth eNB. At this moment, the second UE is not connected to the fourth eNB, so the communication (of either control information or data) may take place with the fifth eNB. In step 311, the second UE receives (Rx) or transmits (e.g., Rx PDSCH from the fourth eNB, if the measurement reports associated with the fourth eNB led to such a decision) as a result of the Transition Adjustment Process. In general, the fifth eNB and the second UE may be close to the fourth eNB, which is going through the transition, and the fifth eNB and the second UE may be affected by the transition. For example, the second UE may become connected to and served by the turning-on fourth eNB, and the fifth eNB may participate in the process of connecting the second UE with the fourth eNB.

In step 307, a sixth eNB reconfigures and signals to a third UE regarding the reconfiguration. In step 309, the third UE measures and reports CSI/RRM/RLM to the sixth eNB. In general, the sixth eNB and the third UE may not be close to the fourth eNB, which is going through the transition process, so the sixth eNB and the third UE may not be as greatly affected as the components described in steps 306/308/311, but the sixth eNB and the third UE may still be affected as the third UE experiences interference transition when the fourth eNB is turning on. To cope with the interference change or in anticipation of this change, reconfiguration of the sixth eNB and the third UE may be done as shown in steps 307/309.

From steps 310, 311 and 309, the eNBs may exchange information over the backhaul, as shown in step 312. In step 313, the fourth eNB adjusts transmission or reception (e.g., Tx CSI-RS at a different power level). For example, if the fourth eNB transmission power is deemed too high by the network based on various feedback and measurement reports, the fourth eNB may reduce its transmission power, and the Transition Adjustment Process may continue until convergence occurs or certain criteria are achieved.

After the Transition Adjustment Process is complete, in step 314, a seventh eNB signals a reconfiguration signal to a fourth UE, as a new interference condition (or more generally, a network configuration) is in place. In step 315, the fourth UE performs reconfiguration (e.g., resets its filters).

The terminologies, timing, and timing order with respect to FIG. 3 may not be strict, some steps may be skipped, reordered, or changed, and some terminologies may be generalized or specialized. For example, step 304 may be included in the Transition Adjustment Process. The Transition Adjustment Process (steps 305-313) may be intertwined with the decision making processes (steps 301-304), and may be performed on probing resources only (e.g., in parallel to other normal transmissions) or on all relevant resources. The CSI-RS resource configuration change signal (step 306) and the reconfiguration signal (step 314) may be different in general.

Probing Resources

During the Transition Adjustment Process, the eNB with the point that has just been turned on may need to test several different configurations. The testing may be done by adjusting the power levels (including turning on or off a transmission point and/or a carrier), adjusting the number of ports, adjusting the bandwidth, changing carriers, etc. Such actions may occur in an iterative way. For example, the eNB may transmit at a power level and, based on UE feedback, may increase or decrease the power level. Each power level may lead to a different interference to other eNBs and/or UEs, and therefore the other eNBs and/or UEs may need to adjust their configurations, transmissions, and/or receptions. These adjustments may cause a chain reaction that affects the original eNB as well, and hence more adjustments may be needed. In this process, the UE's PDSCH transmission may be affected. For each adjustment, the network monitors UE feedback. The adjustments and feedback may cause network operation to fluctuate in an unwanted way, such as the UE experiencing lower than normal PDSCH transmission rates lasting for a time, such as hundreds of milliseconds. In other words, it may take a long time for the network to achieve a configuration with suitable and desired performance, and during that process normal data transmissions may be impacted.

An alternative is to perform a similar procedure in a proactive or prepared way. For example, the system impact or performance may be predicted on a smaller scale of resources before the transition. Such a procedure may be done in parallel with the network's normal operations, and thus the normal operations may not be affected. These normal operations may include normal data transmissions, normal control or system information transmissions, normal RRM/RLM/CSI measurements and feedback, etc. Resources more suitable for the adjustment processes or probing periods may be defined and/or allocated. The eNBs may configure probing resources, and may signal the configured probing resources to selected UEs. A selected UE may be configured to measure on the probing resources (for signals and/or interferences) during the same time period, and may report CQI/RRM/RLM measurement reports. The network may iterate until it finds a suitable transition and a suitable configuration after the transition, based on varying the transmissions on the probing resources and the feedback reports. Finally, the network performs the transitions. The final transitions are expected to be less interruptive and shorter in time since the decided final configurations have been tested to have the desired performance and/or to correspond to a steady state. Such a procedure may significantly reduce the impact on the network and the time spent on adjustment or probing processes.

Thus, during the Transition Adjustment Process, it may be useful to utilize probing resources, such as to perform the transition adjustment on probing resources only. The network may predict the system impact and/or performance before the transition based on measurements on a smaller scale of resources. The measurements related to the prediction may be made in parallel with the network's normal operations without affecting the network's normal operations. A selected UE may be configured to measure the probing resources (for signals and/or interferences) during the same time period, and may report CQIs, RRM measurements, RLM measurements, etc. The network may iterate until it finds a suitable transition and a suitable configuration after the transition by continuing to adjust the transmissions based on the probing resources and the feedback reports. Multiple configurations may be probed in a parallel fashion or sequentially. Finally, the network performs the transitions. Such a procedure may significantly reduce the impact on the network and the time spent on adjustment or probing processes. The concepts and procedures of using probing resources may be adopted and utilized in general network reconfigurations, iterated network optimizations, etc.

Probing resources may include probing reference signals (P-RS) and probing interference measurement resources (P-IMR). In LTE and LTE-A, P-RS may be considered a special CSI-RS, which may be called P-CSI-RS. A UE may not need to distinguish P-CSI-RS from other CSI-RS. P-IMR may be considered a special CSI-IM resource, which may be called P-CSI-IMR. A UE may not need to distinguish P-CSI-IMR from other CSI-IM resources. Any generalization or specialization or variation of the reference signals or interference measurement resources in LTE or LTE-A may also be used for probing. An RRM/RLM or CSI report may be configured based on the P-RS and P-IMR. Therefore, probing resources may be UE transparent at times. The filter state may be reset once the eNBs start or finish testing a configuration. The reset may include both the signal measurements and interference measurements. The interference measurement restart may be triggered by a reconfiguration signal to a UE. However, the signal measurement restart may be triggered by another reconfiguration signal. Alternatively, this reset may be done automatically according to a specific timing window associated with the P-RS or P-IMR or the corresponding CSI. The timing configuration may be configured by signaling or specifications. Alternatively, triggering signaling may be sent to a UE to inform the UE about the start, the intervals, and the end of the probing process. In existing standards specifications, multiple CSI processes (CSI reporting configurations, each of which is generally associated with one signal-interference condition) can be supported, but only one RRM measurement process is supported. Introducing P-RS and P-IMR based RRM measurements may introduce multiple RRM measurement processes into the system.

In general, however, the probing resources are not necessarily based on P-CSI-RS or P-CSI-IMR. The resources may be based on general P-RS and P-IMR, which may be any time/frequency RS resources and CSI-IM resources assigned for probing purposes. Moreover, the resources may not be based on separate P-RS or P-IMR. Instead, the resources may be any general time/frequency resources usable for probing purposes. For example, CRS-like reference signals may be used for probing, and the UE may need to first detect the signals, then remove the signals to estimate the interference on the same time/frequency resource, and finally generate CQI reports. For example, the eNBs may assign some time/frequency resources on which some eNBs may transmit data and/or DMRS. The UE may decode the data and/or DMRS and may measure and report CSI (e.g., CQI, PMI, RI, modulation and coding scheme (MCS) level, RSRP, RSRQ, signal-to-interference-plus-noise ratio (SINR), channel covariance matrix, interference level, interference covariance matrix, delta CQI, delta RSRP, delta RSRQ, and/or delta interference), or the UE may measure and report the general condition of the transmission (e.g., acknowledgement/negative acknowledgement (ACK/NACK) or the probability of a decoding error). The eNBs may probe for one or more configurations concurrently (e.g., to use the frequency dimension to help reduce probing duration) on multiple probing resources, and the UEs may be required to measure and report one or more CSI. The probing resources may or may not be dedicated for probing purposes only. The eNBs may instead reuse a subset of CSI-RS and CSI-IM resources to perform probing and may reuse a subset of CSI report configurations to report the channel status. The eNBs may also schedule some physical resource blocks (PRBs) to transmit dummy data, using some configurations to be probed to check the UE feedback. The eNBs may also allocate specific resources for probing and configure certain parameters for probing (such as measurement timings and/or reporting timings) and may signal the resources and/or parameters to the UEs. The UEs may follow defined probing procedures with the signaled parameters on the specified resources, in which case the probing is not UE-transparent. The probing resources set aside by the eNB may lie on UL time/frequency resources, in which case the probing may be done in the uplink.

Probing resources may be used mainly for adjustment, probing, and/or prediction purposes and are not limited to the transition of a point turning on or off. Such resources may be applied in general network resource adaptations and transitions or in a transmission scheme change (e.g., a CoMP scheme change) in an iterative way. Such resources may be used for adjustment or fine tuning of cell association, power levels, carrier selection, carrier/point on/off decision, load balancing/aggregation/shifting, number of antenna ports, antenna configurations, bandwidth, antenna tilts, codebook structures and parameters, rank adaptation, or precoding. Such resources may be used to provide the eNB the ability to dynamically use a different transmission scheme based on the feedback using the probing resources. Probing resources may be configured differently from different subbands to experiment with different configurations at the same time. Feedback based on probing resources may be more lightly weighted than other feedback, e.g., lower accuracy, lower overhead, and/or with PMI/RI, etc. Measurements and feedback reports based on probing resources may include CQI, PMI, RI, MCS level, RSRP, RSRQ, channel covariance matrix, interference level, interference covariance matrix, delta CQI, delta RSRP, delta RSRQ, and delta interference. Such reports may also be used for UL adjustment or probing or performance prediction. Moreover, in order for the network to be able to determine suitable transmission schemes by probing, the network may need to support most or all of the transmission modes on probing resources. For example, the normal data transmission may be in transmission mode 8 (TM8), while in the meantime the probing transmission is set to be consistent with TM10. To determine data SINR for, e.g., TM10, by probing, the network may configure a UE to first report CQI/PMI/RI/MCS based on reference signal resources and interference measurement resources of the probing resources, followed by reporting SINR based on data (or dummy data) received on probing resources.

In E-UTRA, RSRQ is the ratio N×RSRP/(E-UTRA carrier RSSI), where N is the number of RBs of the E-UTRA carrier RSSI measurement bandwidth. The measurements in the numerator and denominator are made over the same set of RBs. E-UTRA Carrier RSSI comprises the linear average of the total received power (in [W]) observed only in OFDM symbols containing reference symbols for antenna port 0, in the measurement bandwidth, over N number of RBs by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes. In future releases, RSSI may be measured on certain REs specified by the eNB. In general, total received power includes all radio frequency (RF) signals received by a UE, such as the signals from serving cells, interference, and noise, over the time/frequency resources specified in the specifications or indicated by a network controller.

Figure 4:
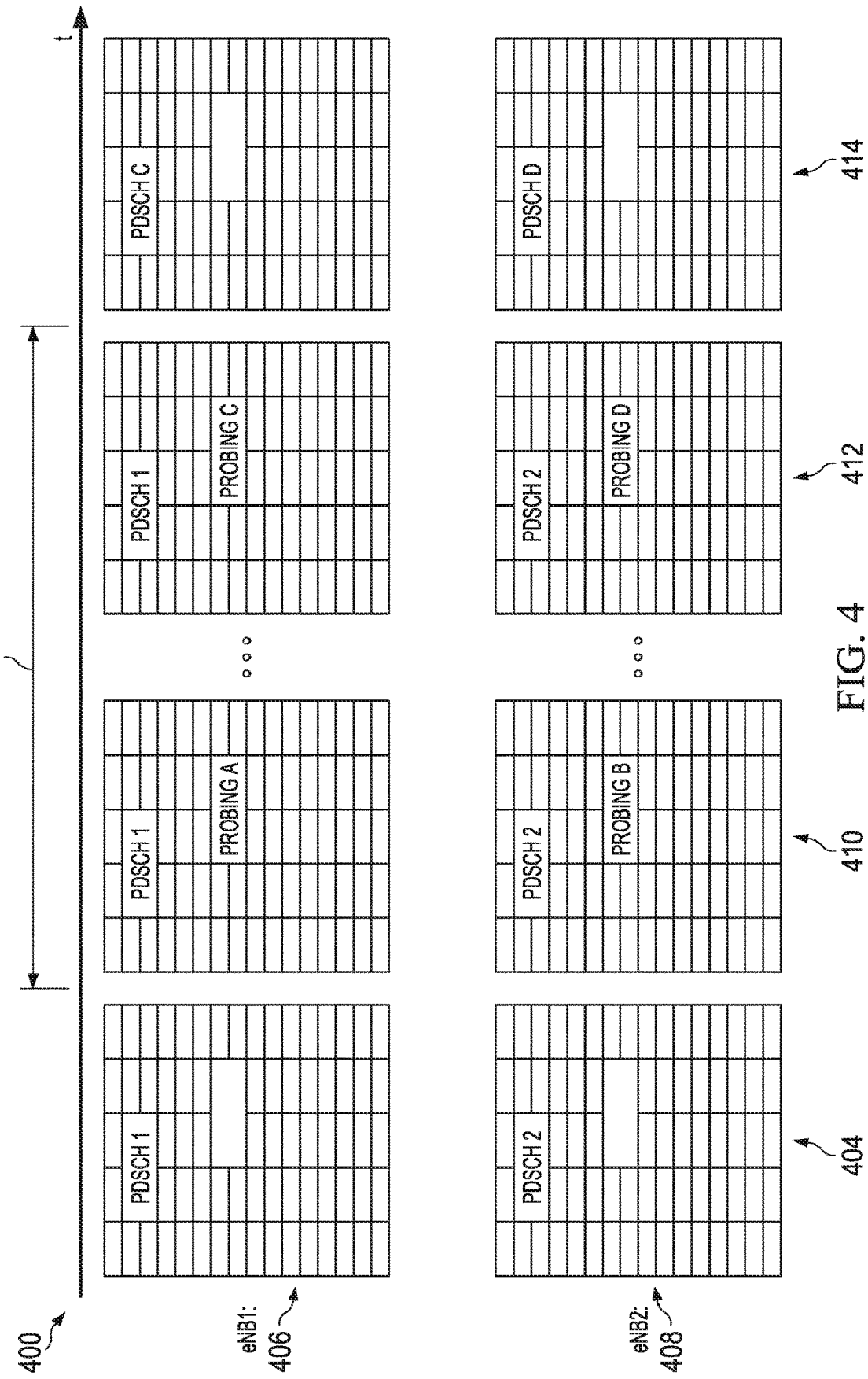
FIG. 4 illustrates a transition adjustment period timeline.

FIG. 4 illustrates a timeline of operations 400 for a transition adjustment period 402 based on probing resources. In the first column 404, eNBs, e.g., eNB1 406 and eNB2 408, set aside probing resources, and coordinate probing transmissions and timings. In the second column 410, eNBs test probing transmissions and adjust. In the third column 412, convergence is achieved on probing resources. In the fourth column 414, the network operates per the selected reconfiguration. Further details of various embodiments are described below.

Figure 5:
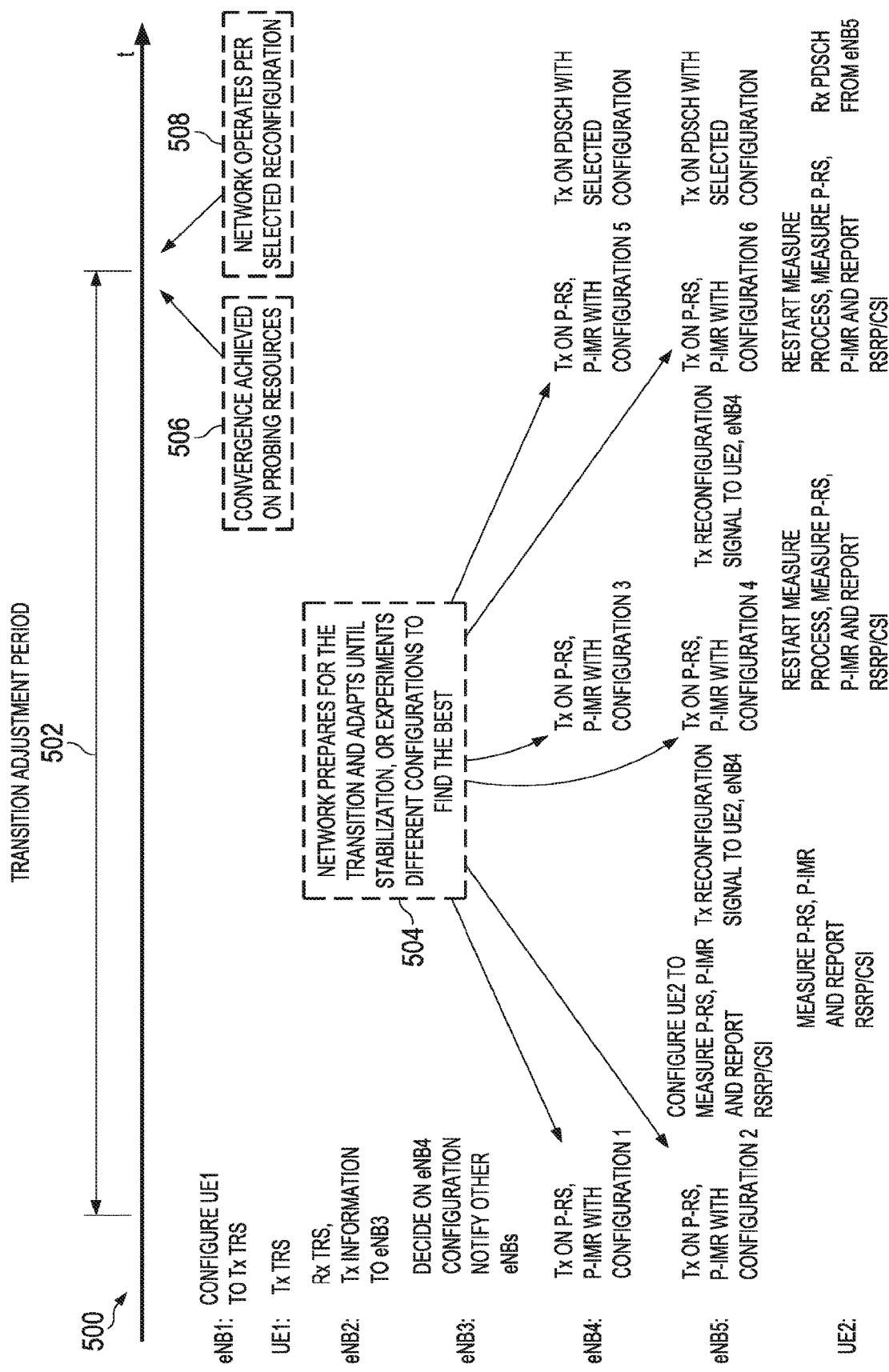
FIG. 5 illustrates a transition adjustment period timeline.

FIG. 5 illustrates an example timeline of operations 500 for a transition decision and a transition adjustment process 502 based on probing resources. The network prepares for the transition and adapts until stabilization, or experiments with different configurations to find the desired or best configuration at 504. Convergence and/or the desired behavior is achieved on probing resources at 506, and the network selects a reconfiguration and operates per the selected reconfiguration at 508.

In various embodiments, an eNB experiencing a transition or foreseeing a transition may take the following steps. The eNB may send a reconfiguration signal, together with timing information, over the backhaul to other eNBs. The eNB may send a reconfiguration signal, together with timing information, to its UEs. The eNB may configure probing resources, including a P-RS and a P-IMR to its UEs, and may configure a transmission scheme with coordination with other eNBs on the probing resources. The effects of the transition and reconfigurations are iteratively evaluated and/or predicted by the network on the probing resources only. The final configuration obtained at the end of the evaluation period is then applied on all relevant resources. The relevant resources may or may not be in the same type of carrier as that on which the probing was done. For example, the final configurations may be applied on a new carrier type (NCT) whereas the probing may have been done on a Release 8 compatible carrier.

Various embodiments provide transmission, reception, and signaling methods and systems for reconfiguration in wireless networks. Embodiments provide signals and processes supporting the reconfiguration, either after the transition or jointly with the transition. Such signals and processes may include backhaul signaling to coordinate the reconfiguration among multiple nodes, reference resources, such as probing resources including P-RS and P-IMR, to measure the effect of transition and reconfiguration by UEs, and reconfiguration signaling to UEs to indicate the occurrence of transition and reconfiguration to the UEs. For example, UEs may restart their measurement processes for the updated configurations.

In an embodiment, the impact of the transition and adaptation may be evaluated by multiple nodes and/or UEs before, during, and/or after the transition and adaptation take place. Probing resources based on CSI-RS and interference measurements may be used to evaluate the impact of the transition, adaptation, and/or reconfiguration before the transition, adaptation, and/or reconfiguration is applied to the PDSCH. In an embodiment, the network and UEs may adjust their configurations. Signaling from an eNB to a UE or another eNB may indicate that a transition and/or reconfiguration will occur such that the UE and other eNBs can operate accordingly. Embodiments provide reconfiguration signals and processes when the network adapts its topology and/or transmissions. Embodiments may be implemented in handsets and networks used in wireless communication systems.

Probing may or may not always involve UEs. For example, as described with regard to FIG. 2, probing may be used to reconfigure the transmissions between macros and relays over the air. Probing may or may not always involve eNB reconfigurations. For example, in a device-to-device (D2D) or direct mobile communication (DMC) network, probing may be used to reconfigure the transmissions between UEs. In these cases, the general approaches described in various embodiments may still be applied with appropriate modifications.

As an example, the network may be experiencing decreased traffic load and may be trying to turn off some picos to save energy and reduce emission. The network may determine some candidate picos to be turned off. However, these candidate picos may be serving UEs, and if some of the picos are actually turned off, their UEs may need to be offloaded to other active picos. Such offloading may significantly change various aspects of the network operations, such as interference conditions, pico/UE associations, and pico loadings. For example, if a UE is offloaded from its current pico to another pico, the second pico may see an increase of its loading. If the increased loading exceeds a threshold, the UE QoS may suffer significantly, and hence the network may decide not to offload to the second pico or may decide not to turn off the first pico. It can be seen from this particular example that the network may need to predict the new operation condition before making a transition decision. Otherwise, the decision may cause severe problems. But such a prediction, though very useful and highly desired to be as accurate as possible, is very difficult to achieve with sufficient accuracy without being actually tested in the network. In this situation, probing may be beneficial. For example, on some probing resources, a first pico "emulates" the case that it is turned off (and hence interference to neighboring points' UEs is reduced) and its UE is offloaded to a second pico. The UE reports the CQI associated with this probing setting, which may help the network to determine if the decision to turn off the first pico is eventually beneficial or problematic. A second pico may perform the actual transmission and/or scheduling of the UE on the probing resources so that the network can obtain even more accurate information regarding the impact of turning off and offloading.

Embodiments may affect standards in various ways. For DL or backhaul signaling, an eNB may send a reconfiguration signal (together with a timing) to UEs and other eNBs. The UE may assume that a new measurement condition (for signal measurements and/or interference measurements) will be in effect for the indicated CSI-RS resource configuration, CSI-IM resource configuration, and/or CSI process configuration. The eNBs may be assumed to reconfigure according to their UEs' feedback based on the indicated resources.

For DL or backhaul signaling, an eNB may send a signal to indicate the start and/or finish of a transition adjustment period. Within the period, the probing resources may be used to experiment with several configurations. A UE may apply a measurement timing window during the period. After each timing window, the UE may restart its measurement process on the probing resources.

Regarding UE reconfiguration signal design, if the reconfiguration signal is in the PDCCH or EPDCCH, the latency is small, but downlink control information (DCI) formats may need to be modified to include the reconfiguration indications. The reconfiguration may not be logically related to DL/UL grants since it may happen that when an eNB needs to transmit a reconfiguration signal to a UE, the eNB has no DL/UL grants for the UE. Then a reconfiguration signal may be a field of a DCI format, or may be a special, light-weight DCI only for reconfiguration. If the reconfiguration signal is in upper layer signaling, the latency may be large, but there may be no need to modify DCI formats. If the reconfiguration signal is in common channels, a drawback may be that not all UEs may need to reconfigure.

Regarding UE behavior, in general, UE layer 1 filtering design and operation is an implementation issue not specified in the specifications. However, the UE may need to be signaled if a network transition occurs, which may require specification support. Whether and/or how the UE reacts is generally left for implementation, which does not require specification support. UE layer 3 filtering for RSSI/RSRQ may need to be reset, and if so, that filtering may need to be standardized.

Regarding UE behavior, if the probing resources are mainly used for generating the probed CSI, the UE may need to rate match around the probing resources, regardless of whether the resource is used as P-RS or P-IMR, and regardless of whether the probing resources are CSI-RS/CSI-IM resources or not. However, if the probing resources carry actual data, i.e., the probing resources are used for data transmission instead of for measurement purposes only, then the UE may not perform rate matching on all probing resources. Instead, the UE may perform rate matching on the subset of probing resources that are for measurement purposes only. Appropriate rate matching signaling may be used to support these operations, such as the signaling of zero-power CSI-RS configurations to a UE.

The probing resources may be associated with a trigger or a timing window to automatically restart the measurement process. RRM/CSI feedback report configurations based on the probing resources may be different from other feedback reports. Therefore, multiple timing configurations may be used for multiple measurement processes or configurations.

In an embodiment method for adaptation in a wireless network, eNBs coordinate and set aside a set of time/frequency resources for probing purposes, eNBs coordinate a set of operations (probing transmissions) and timings to be used to synchronize actions of eNBs and UEs, eNBs signal the resources and timings to UEs, eNBs perform the coordinated operations on the resources according to the timings, and eNBs receive feedback reports from UEs based on UE measurements on the signaled resources according to the signaled timings (eNBs collecting probing impact). eNBs further coordinate the operations for further probing or applying probing transmissions on broader time/frequency resources.

An embodiment method for adaptation in a wireless network includes the following steps. eNB1 sends UE1 a configuration of a measurement process, a configuration of measurement resources associated with the measurement process, a time interval associated with the measurement process, and a reporting configuration associated with the measurement process. These items as a whole may be referred to as probing-related configurations. One or more of these configurations may be combined as one configuration or included in another configuration. For example, the configuration of measurement resources may be included in the configuration of a measurement process. The measurement process may be a CSI process as defined in 3GPP Release 11, which may contain configurations of channel and/or interference measurement resources (e.g., CSI-RS resources and CSI-IM resources). The reporting configuration may indicate periodic reporting (in which case the periodicity and subframe offsets of the reporting subframes may be signaled) or aperiodic reporting (in which case the reporting trigger information may be signaled). The time interval specifies that the measurement should be performed within the time interval.

Moreover, eNB1 may send signaling to UE2 to indicate probing-related configurations pertinent to UE2. The time interval sent to UE2 may be generally the same as that sent to UE1. The other configurations sent to UE2 may or may not be the same as those sent to UE1. Not all UEs served by eNB1 may receive such configurations.

Upon reception of the configurations, UE1 may perform a measurement in accordance with the measurement process configuration based on the configured measurement resource within the configured time interval. For example, UE1 may perform SINR measurement based on the CSI-RS resource and CSI-IM resource, starting from the beginning of the time interval and ending at the end of the time interval. Then the UE may generate a report in accordance with the measurement process configuration and the reporting configuration based on the measurement.

eNB1 may send the time interval information and/or measurement resource configuration information to eNB2. In general, the measurement resource configuration information may be associated with UE1 and/or UE2, or with part or all of the UEs receiving probing-related configurations from eNB1, but the measurement resource configuration information may or may not be identical to the measurement resource configuration received by any UE from eNB1. In other words, eNB1 may aggregate and/or select the measurement resource configurations sent to its UEs, and send the aggregated and/or selected measurement resource configurations to eNB2. eNB1 may also send the time interval information and/or measurement resource configuration information to eNB3. Though in general the time interval information is the same, the measurement resource configuration information sent to eNB3 may or may not be the same as that sent to eNB2. eNB2 may send probing-related configurations to its UEs, wherein, in general, the time interval information is the same across all UEs and all eNBs (though the network has the flexibility to configure the time intervals differently for different eNBs and/or UEs if there is some propagation isolation, for example).

The time interval may be configured as a starting time, a time duration, and/or an ending time. The starting time may be indicated as a time offset (such as a certain number of subframes later than the reception subframe), or as a time in the future (such as a subframe within a radio frame with a certain system frame number), or by a starting time trigger. The ending time may be indicated similarly. Alternatively, the ending time may be indicated indirectly from the starting and a time duration. There may be multiple time intervals, which may be contiguous in time. The time intervals may be indicated by a starting time using the abovementioned methods as well as a periodicity. Alternatively, the periodicity signaling may be sent at the starting time of the first time interval so that the UE can obtain both the periodicity and starting time from one signaling.

Another way of specifying multiple time intervals to a UE is based on starting time triggers. When the UE receives a first starting time trigger, the UE starts the measurement. When the UE receives a second starting time trigger, the UE understands that the first time interval is ending and the second time interval is starting, and the UE resets the measurement process accordingly. With either one or multiple time intervals, the UE generates one or more measurement reports according to the measurement process configuration and reporting configuration. Each report is based on measurement over the configured measurement resources within one time interval of the one or multiple time intervals. The timing configuration may also include one or more timing gaps during which the UE does not perform measurements. The configuration of a timing gap may be combined with the above-mentioned embodiments. A UE may receive a set of time intervals for one type of measurement and another set of time intervals for another type of measurement, such as different time intervals for RRM and CSI measurements, or different time intervals for signal and interference measurements.

A point may take a backhaul connection only state, a limited monitoring state, a probing state, or an active state. In the backhaul connection only state, the point has completely turned off its over the air Tx/Rx and can only Tx/Rx signaling over its limited backhaul. In the limited monitoring state, the point can perform limited Rx over the air and no Tx over the air, and can Tx/Rx signaling over its limited backhaul. In the probing state, the point can perform over the air Rx, over the air Tx of reference signals, and Tx/Rx over its limited backhaul. The point may adjust its transmission parameters (e.g., RS power) during this state. In the active state, the point can perform over the air Tx/Rx of data and Tx/Rx over the possibly high-speed backhaul.

Figure 6:
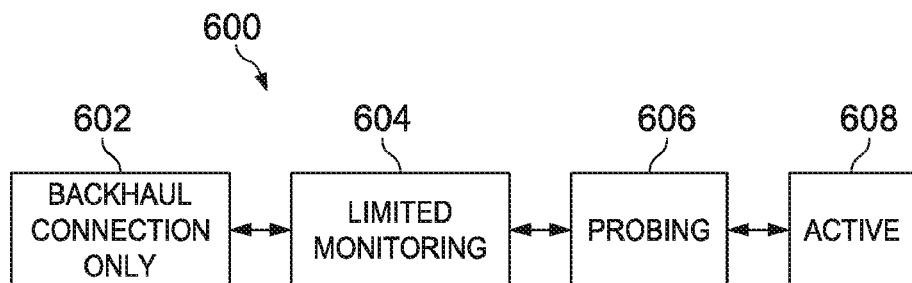
FIG. 6 illustrates state transitions for a point.

FIG. 6 illustrates state transitions 600 for a point. The point may transition between a backhaul connection only state 602, a limited monitoring state 604, a probing state 606, and an active state 608. A point going through a state transition may need to signal to its UEs and neighboring points over the air or over the X2 interface, which may trigger a transition adjustment process across multiple eNBs and UEs. A point here may be a cell, antenna set, frequency band/carrier, macro/pico/femto/relay, etc. In addition, a point may be transitioned to or from a completely powered-off state, and the reconfiguration and transition adjustment process may be applied as well.

Figure 7:
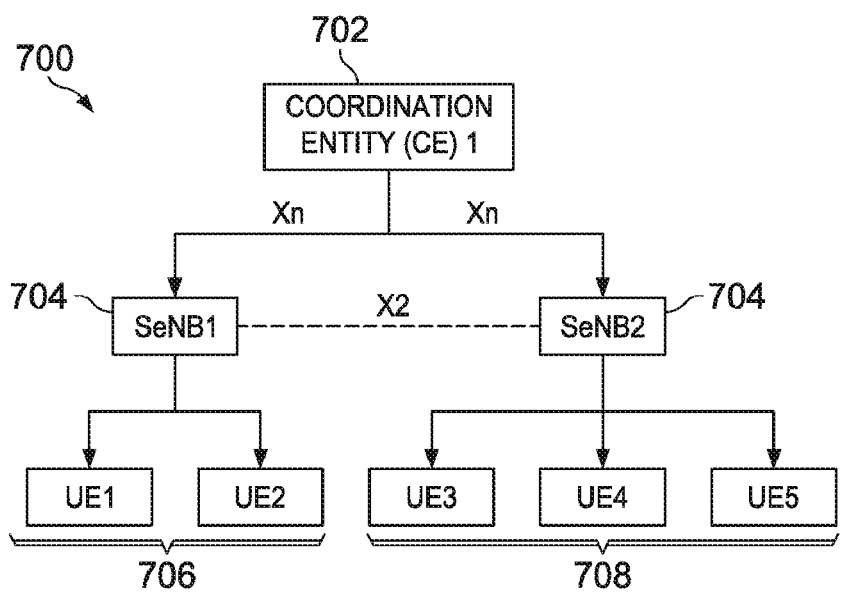
FIG. 7 illustrates an example system diagram.

FIG. 7 is a diagram of a system 700 with a coordination entity (CE) 702 coordinating multiple eNBs 704. The CE 702 may be a macro eNB or other network entity. The SeNB 704 stands for secondary (or small cell) eNB, which may be coordinated by the CE 702 via the Xn interface, usually over a non-ideal backhaul. The SeNBs 704 may be connected via the X2 interface, usually over a non-ideal backhaul. The CE 702 can coordinate the on/off, carrier selection, load balancing/shifting/aggregation, and other general interference management and coordination operations of the SeNBs 704. UEs 706 and 708 are coupled to the SeNBs 704.

Figure 8:
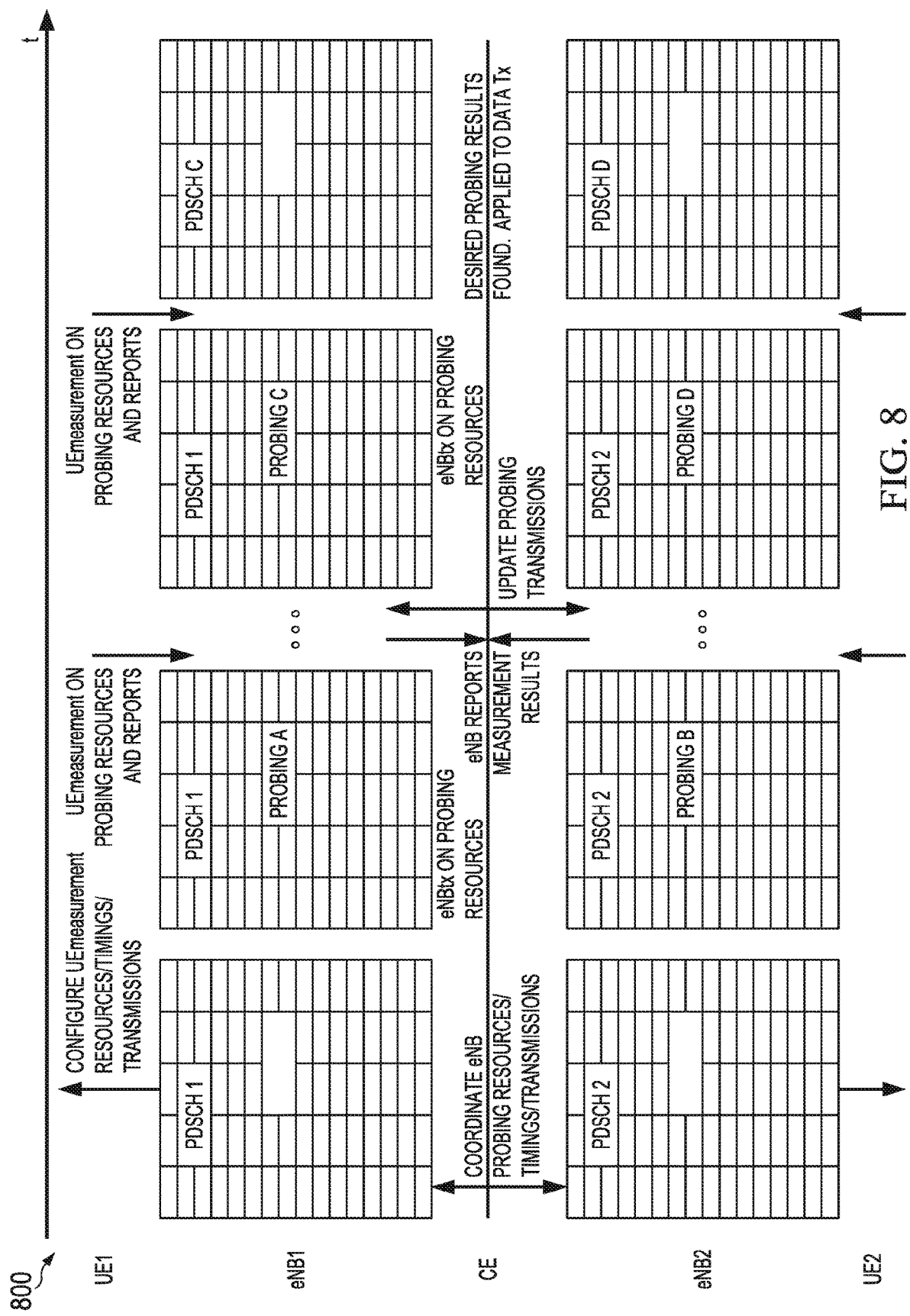
FIG. 8 illustrates an example of probing operation.
Figure 9:
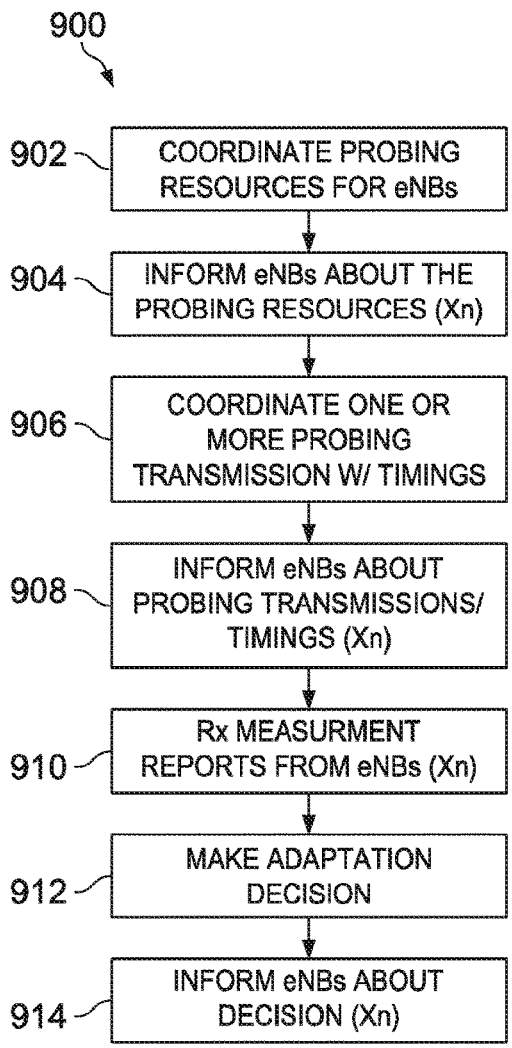
FIG. 9 illustrates a flow diagram of CE operation.
Figure 10:
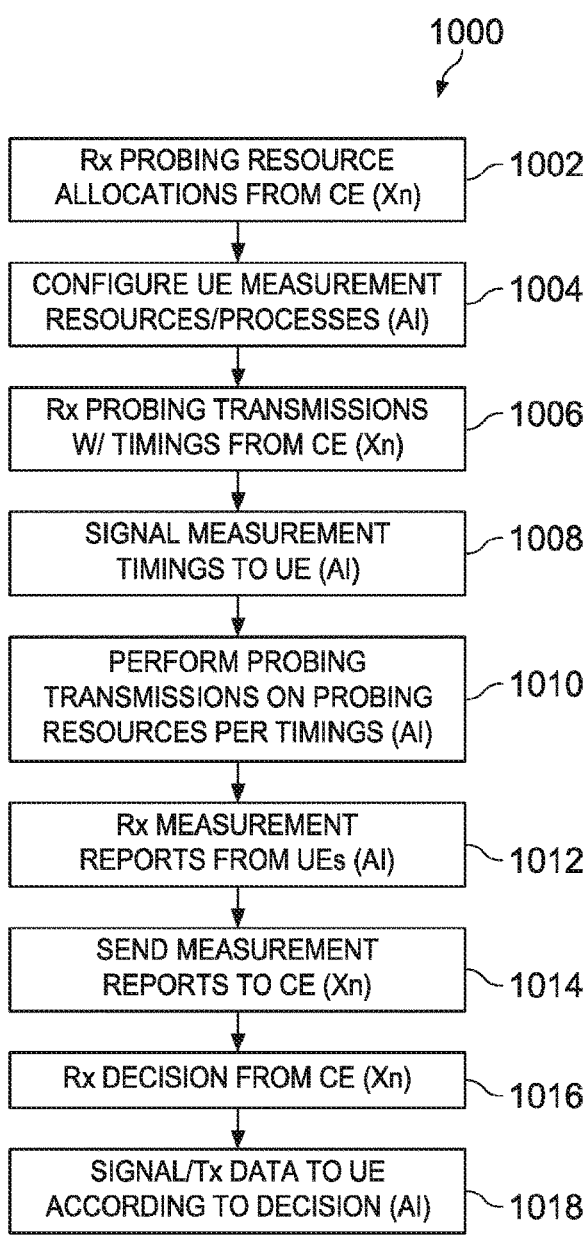
FIG. 10 illustrates a flow diagram of eNB operation.
Figure 11:
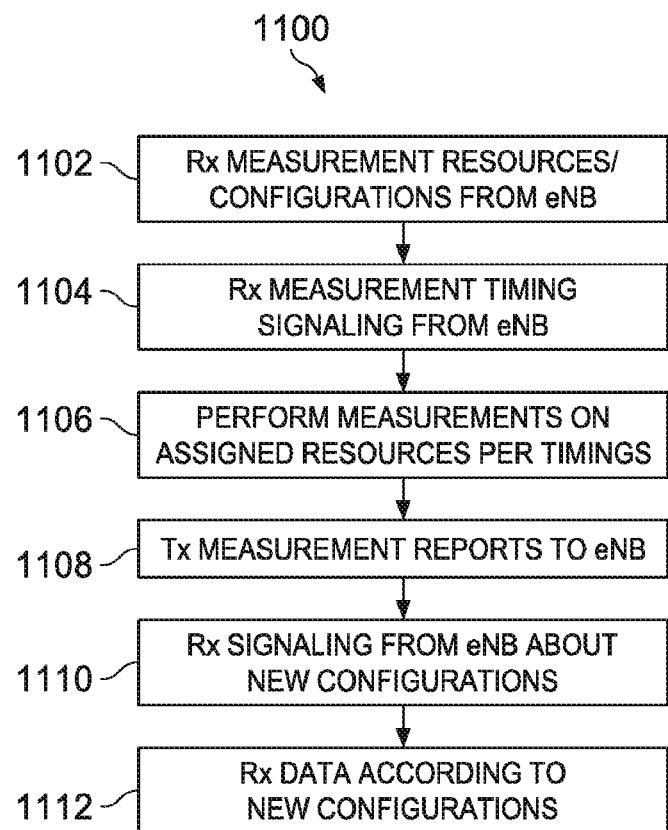
FIG. 11 illustrates a flow diagram of UE operation.

An example of the probing operation 800 over this system architecture is shown in FIG. 8, and flowcharts are shown in FIGS. 9-11. In FIGS. 9-11, the annotations inside the parentheses indicate over which interface the signaling is sent. Xn indicates signaling sent over the Xn interface, while AI indicates signaling or data sent over the air interface. A flowchart for CE operation 900 is shown in FIG. 9. In step 902, the CE coordinates probing resources for a plurality of eNBs. In step 904, the CE informs the eNBs about the probing resources. In step 906, the CE coordinates one or more probing transmissions with timings. In step 908, the CE informs the eNBs about probing transmissions and timings. In step 910, the CE receives measurement reports from one or more eNBs. In step 912, the CE makes the adaptation decision, and in step 914, the CE informs the eNBs about the decision.

A flowchart for eNB operation 1000 is shown in FIG. 10. In step 1002, the eNB receives probing resource allocations from the CE. In step 1004, the eNB configures UE measurement resources and/or processes. In step 1006, the eNB receives probing transmissions with timings from the CE. In step 1008, the eNB signals measurement timings to one or more UEs. In step 1010, the eNB performs probing transmissions on probing resources per the timings. In step 1012, the eNB receives measurement reports from the UEs. In step 1014, the eNB sends measurement reports to the CE. In step 1016, the eNB receives the decision from the CE. In step 1018, the eNB signals data to the UE according to the decision.

A flowchart for UE operation 1100 is shown in FIG. 11. In step 1102, the UE receives measurement resources and/or configurations from the eNB. In step 1104, the UE receives measurement timing signaling from the eNB. In step 1106, the UE performs measurements on assigned resources per timings. In step 1108, the UE transmits measurement reports to the eNB. In step 1110, the UE receives signaling from the eNB about new configurations. In step 1112, the UE receives data according to the new configurations.

The preceding discussion has been directed toward probing-based network adaptation, which deals with network-wide configurations such as the transmission scheme used in the network, transmission power levels used in the network, the network nodes that are turned on or off, whether CoMP or similar advanced transmission techniques are used, and similar topics. The discussion will now turn to probing-based link adaptation, which may be considered a special case of probing-based network adaptation.

In a wireless network, probing may be used to determine the appropriate link adaptation, including the MCS levels, rank, and UE pairing (for multi-user multiple-input, multiple-output (MU-MIMO), for example). In an embodiment, in such probing-based link adaptation, a serving eNB and one or more potentially interfering eNBs transmit probing signals to a UE before transmitting actual data signals. The eNBs transmit the probing signals at the same time and on the same time/frequency resources. Thus, the interference the UE experiences in a probing transmission is similar to the interference the UE will experience in an actual data transmission. The REs on which a probing signal is sent are a subset of the REs that will be used for an actual data transmission. That is, the number of REs occupied by a probing signal is less than the number of REs in a subframe. The UE measures the CQI or some other channel quality parameter of the probing signals and, based on the measurement, determines an MCS level appropriate for the current channel conditions. The UE then informs the eNBs of that MCS level. The eNBs then use that MCS when transmitting actual data to the UE. In this way, eNBs can transmit with an MCS level that is appropriate for the current channel conditions.

In particular, in an embodiment, multiple eNBs transmit on the same time/frequency resources of the P-RS using a tentative MCS. These transmissions may be called pre-transmissions, probing transmissions, or P-TX. UEs receiving the P-TX perform measurements on the P-RS and calculate an updated MCS, for example. Alternatively, a CQI or other channel quality parameter may be derived based on the MCS. If multiple layers are used, multiple MCSs may need to be calculated. The updated MCS is reported to the eNBs. Alternatively, the MCS may be indicated by the difference between the MCS and a reference MCS known to at least one of the eNBs and the UE. The eNBs then perform the actual data transmissions associated with the P-TX using the updated MCS. The actual data transmissions may be called actual transmissions, post-probing transmissions, or A-TX. Since the transmission scheme and other parameters associated with the A-TX are the same as those associated with the P-TX except for the MCS, and since changes of the MCS have little impact on the UEs' SINR, it can be seen that the UEs experience almost the same SINR in the A-TX as in the P-TX. Hence, the MCS determined during the P-TX will match the SINR in the A-TX reasonably well. In other words, probing can be used to significantly reduce the mismatches in link adaptation. The much improved accuracy in link adaptation can then translate to throughput performance gains.

Figure 12:
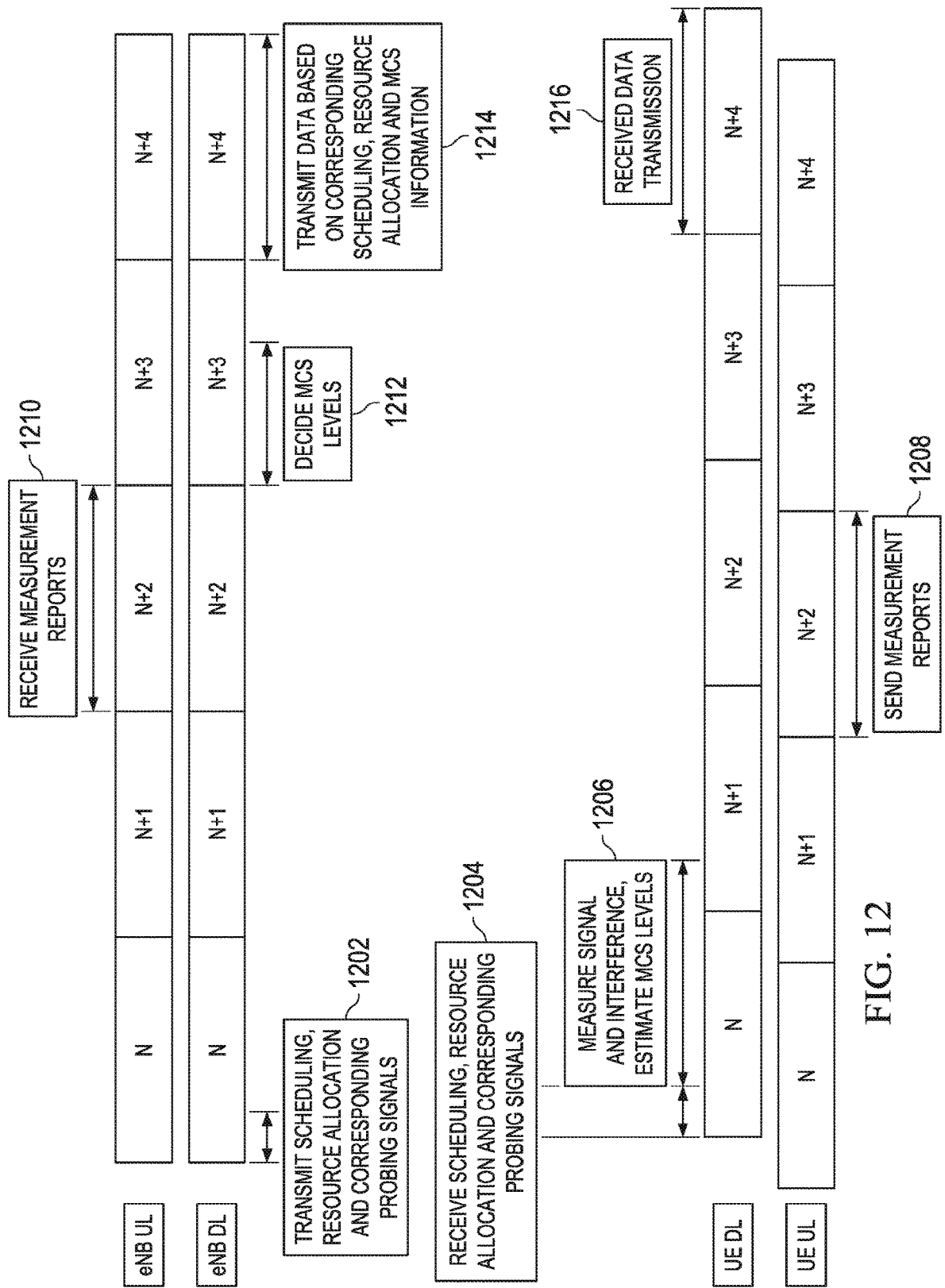
FIG. 12 illustrates an example of a probing-based link adaptation procedure.

FIG. 12 illustrates an embodiment of the probing-based link adaptation procedure. At 1202, an eNB transmits scheduling, resource allocation and corresponding probing signals. At 1204, a UE receives the scheduling, resource allocation and corresponding probing signals. At 1206, the UE measures the signal and interference and estimates an MCS level. At 1208, the UE sends a measurement report containing the estimated MCS level. At 1210, the eNB receives the measurements report. At 1212, the eNB decides on an MCS level. At 1214, the eNB transmits data based on the corresponding scheduling, resource allocation and MCS information. At 1216, the UE receives the data transmission. Alternatively, at 1208, the UE sends an MCS level determined based on the measured signal and interference, and at 1210, the eNB receives the MCS. At 1212, the eNB decides to use the received MCS level, and at 1214 the eNB transmits using the received MCS level.

It may be noted that one probing result based on a P-TX may be applied to more than one A-TX. In the case of multiple A-TX for a P-TX, the eNBs may perform the scheduling and precoding in all the A-TX subframes consistent with the P-TX. In general, the timing between resource allocation information transmission, probing resource, probing feedback, MCS information transmission, and data transmission may take at most 4 transmission time intervals (TTIs) as shown in FIG. 12, but 3 or even 2 TIs may be sufficient if the UE can receive the P-RS early enough (e.g., using CSI-RS on 5th and $6^{th}$ OFDM symbols) and process the measurements fast enough (i.e., send report on N+1) and if the eNB can prepare the A-TX (transmission block (TB) sizes, etc.) fast enough. In time division duplex (TDD) systems, probing may be used similarly, but the timing and/or latency may be different from frequency division duplex (FDD).

Figure 13:
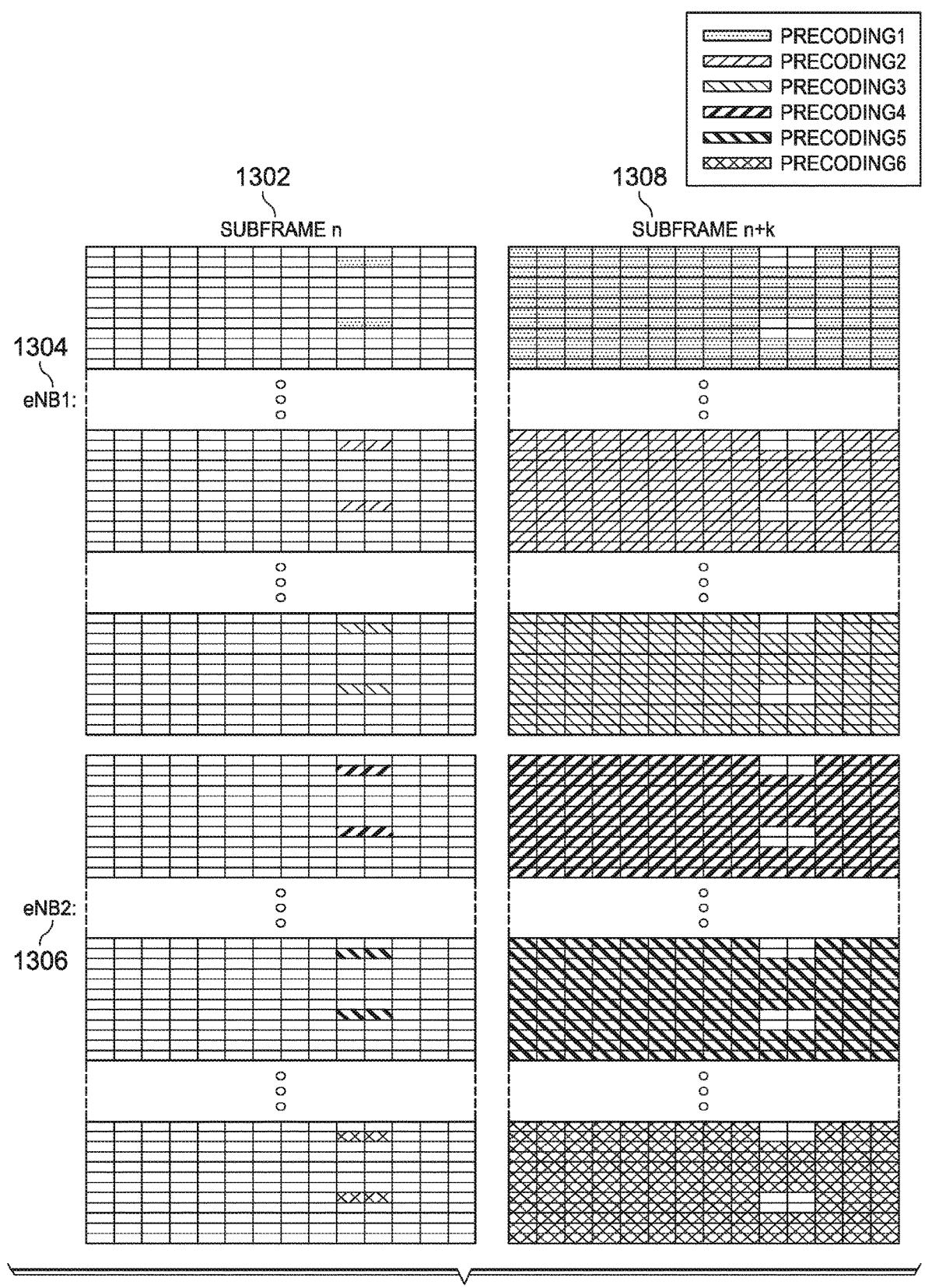
FIG. 13 illustrates an example of probing for link adaptation.

FIG. 13 shows an embodiment of probing for link adaptation. In FIG. 13, at subframe n 1302, eNB1 1304 performs P-TX on the P-RSs (as an example, the P-RSs are CSI-RS and in particular may be non-zero-power (NZP) CSI-RS). That is, eNB1 1304 transmits probing signals at the time/frequency resources labeled precoding1, precoding2, and precoding3, which are a subset of all the time/frequency resources available in subframe n 1302. At the same time, eNB2 1306 transmits probing signals at the time/frequency resources labeled precoding4, precoding5, and precoding6, which correspond in time and frequency to the time/frequency resources labeled precoding1, precoding2, and precoding3. The P-RSs transmitted by eNB1 1304 and eNB2 1306 may be precoded with RB-specific precoding. That is, each RB may be allowed to have a different precoding and rank, but some RBs may share the same precoding and rank (see below for details).

The modulation level for these P-RSs may be fixed to be quadrature phase shift keying (QPSK) for simplicity of UE measurements, but higher order modulations are also allowed for higher accuracy of link adaptation. The coding rate may be chosen to be the lowest coding rate for the associated modulation level, or may be a fixed at a predetermined coding rate known to the UEs, or may be dynamically varying. That is, the MCS level used for the probing transmissions may or may not be optimal for the channel conditions experienced by the UE, but the probing transmissions may be used to determine an MCS level appropriate for those conditions.

It is possible that more than one CSI-RS configuration may be used as the P-RS, which may help increase the processing gains for probing. Multiple probing within one RB may also be allowed for different precoding vectors or matrices. P-RS may not need to span the entire bandwidth. In other words, CSI-RS on some RBs may not be used for probing for link adaptation. The UE may treat such RBs as regular CSI-RS for measurements.

Some UEs served by eNB1 1304 may receive signaling from eNB1 1304 about the probing. Such signaling may indicate to a UE the time/frequency resources on which the UE-specific probing is performed. For example, UE1 may be signaled that the resources associated with precoding 1 and 2 are for UE1's probing. In this case, in general, precoding 1 and 2 are the same. UE2 may be signaled that the resources associated with precoding 3 are for UE2's probing. Likewise, some UEs served by eNB2 1306 may receive signaling from eNB2 1306 about the probing. UE3 may be signaled that the resources associated with precoding 4 are for UE3's probing. UE4 may be signaled that the resources associated with precoding 5 and 6 are for UE4's probing. In this case, in general, precoding 5 and 6 are the same. That is, which RBs are used for which UEs can be partitioned differently for different eNBs.

Then the UE may follow the eNB's instructions for measurements for probing. The signal measurement for the UE may be obtained from all probing resources assigned for that UE (with proper filtering). The interference measurements for the UE may be obtained from all probing resources for that UE, removing the effects of the signals. Then the UE may obtain a composite SINR for all probing resources assigned for that UE (with proper processing) and/or a composite CQI and/or MCS for all probing resources assigned for that UE (with proper processing). The obtained measurement result is then fed back to the eNB. If multiple measurement processes (e.g., CSI processes) are configured for probing, then the UE may not be allowed to mix the signal measurements for different processes, and may not be allowed to mix the interference measurements for different processes. However, within the same processes, the signal measurements may be combined, and the interference measurements may be combined according to eNB indication.

The modulation level for P-RS may be simply QPSK, which matches the general RS design, and has the advantage of simple demodulation. Moreover, the modulation level of the P-RS generally does not affect the SINR of probing, from either the signal statistics or interference statistics points of views. However, if a more complicated receiver algorithm is to be used, such as maximum likelihood (ML) receivers with interference cancellation, then QPSK may not be appropriate for all probing, and the P-TX and A-TX may use the same modulation level in order to have accurate link adaptation.

At a later time, such as at subframe n+k 1308, the eNBs perform the A-TX. That is, eNB1 1304 and eNB2 1306 transmit data in subframe n+k 1308 in the time/frequency resources that were not used for probing transmissions in subframe n 1302. The resource allocation for each UE is generally the same as that for the P-TX. In an embodiment, the time interval between subframe n 1302 and subframe n+k 1308 is configured as common for eNB1 1304 and eNB2 1306. The (new) MCS level in the A-TX for each UE is in accordance with the UE probing feedback. For example, precoding 1 is used by eNB1 1304 for UE1 on all the RBs for UE1, and the associated new MCS is used. Likewise, precoding 3 is used by eNB1 1304 for UE2 on all the RBs for UE2, and the associated new MCS is used. Precoding 4 is used by eNB2 1306 for UE3 on all the RBs for UE3, and the associated new MCS is used. Precoding 5 is used by eNB2 1306 for UE4 on all the RBs for UE4, and the associated new MCS is used. If, in P-TX, eNB1's precoding is transmitted together with eNB2's precoding on a RB, then it may be desirable (at least for simplicity) that in A-TX, eNB1's precoding is transmitted together with eNB2's precoding on the data transmission of the RB. Some changes in the actual scheduling from the pre-scheduling may be allowed, but it may be desirable for the changes to be made in such a manner that each UE continues to experience the same amount of interference. For example, the changes may be a reshuffling of the positions of the RBs by all eNBs simultaneously, or a scaling of the numbers of RBs for a subset of UEs by all eNBs simultaneously. Overall, as the interference at subframe n+k 1308 becomes "predictable", accurate link adaptation is achieved, and the transmissions to the UEs may be successful in one shot. A more aggressive transmission may lead to decoding failures. Rate matching and/or puncturing may be specific so that a UE can remove the non-PDSCH REs. The rate matched REs or punctured REs may be more than P-RS REs used by the UE. In general, if CSI-RS is used for probing, rate matching may be based on zero power (ZP)-CSI-RS, and hence no additional rate matching signaling may be needed. But if non-CSI-RS is used for probing, then rate matching may need to be specified.

P-TX signaling may be designed as follows. First, the signaling may be a DCI, i.e., physical (PHY) layer signaling carried in a PDCCH or EPDCCH in the same subframe as the P-TX. The signaling may be UE-specific or UE-group-specific. The signaling may be independent of the signaling for actual scheduling (if any) in the subframe. The signaling may indicate to a UE that one or more of the CSI-RS configurations are used for probing (i.e., used as P-RS, which may be restricted on certain RBs, subbands, and/or resource block groups (RBGs)). The P-TX signaling may not need to include a CSI-IMR. The number of layers and/or antenna ports may be indicated. The signaling may indicate to a UE the RBs, subbands, RBGs, and/or virtual component carriers (CCs) on which the UE is to perform probing measurements based on the P-RS. The signaling may indicate to a UE that averaging is not to be performed on the probing resources. The signaling may indicate to a UE the RBs, subbands, RBGs, and/or virtual CCs on which the UE is not to perform measurements based on the P-RS. For those CSI-RS REs, regular CSI-RS based measurements may be performed as indicated, or the UE may ignore those CSI-RS for measurements as indicated. If the UE is required to report measurements for all the RBs, subbands, RBGs, and/or virtual CCs but the UE was not informed by the pre-scheduling signaling to perform measurement on some of the RBs, subbands, RBGs, and/or virtual CCs, the UE may assume regular CSI-RS-based measurements on those resources and report on those measurements, or the UE may report INVALID. Multiple probing processes may be indicated. The manner in which the measurement report is to be generated may also be indicated. The P-TX signaling may also include information related to the uplink, such as whether the UE should report its measurements on the PUCCH or the PUSCH and the subframes and/or RBs on which the UE should report its measurements. The P-TX signaling may or may not be in the same subframe and/or same carrier as the P-RS, That is, a cross-subframe and/or cross-carrier pre-scheduling may be allowed. P-TX signaling that includes such information may be referred to as a trigger, since such signaling triggers the UE to perform measurements on the probing signals. Likewise, a DCI that includes such information may be referred to as a trigger.

The UE may generate one probing measurement report based on all probing resources indicated by the signaling. That is, a common MCS and/or SINR for all probing resources indicated by the signaling may be generated and reported. Alternatively, multiple probing measurements for the RBs, subbands, and/or RBGs as indicated by the signaling (or for all RBs, subbands, RBGs, and/or virtual CCs in the carrier) may be generated. That is, a separate MCS and/or SINR for each frequency unit of the probing resources indicated by the signaling (or for the entire bandwidth of the carrier) may be generated and reported. The probing measurement report may contain less information than traditional CQI reporting. In particular, the probing measurement report may contain only the MCS level selected by the UE based on the probing signal.

The A-TX scheduling signaling may be related to the P-TX pre-scheduling signaling. For example, the UE may assume the resource allocations in the two subframes are identical, unless the eNB modifies the allocations. In general, the rank, layer, port, and/or PMI (if needed to be signaled to the UE, such as in a non-DMRS-based TM) may be the same as the P-TX, so the signaling may not need to carry those fields. However, information such as the updated MCS or the new data indicator may need to be signaled. Alternatively, A-TX scheduling signaling may be independent of the P-TX pre-scheduling signaling, and the eNBs may have more flexibility in modifying the A-TX resource allocation.

In probing-based link adaptation, multiple eNBs may transmit probing signals on the same time/frequency resources at the same time. Thus, the UE may experience interference that swamps the signal. In an embodiment, frequency unit bundling may be used to address this issue. The frequency unit may be RBs, subbands, RBGs, or virtual CCs. The following description is for RB bundling but may apply to more generic cases. In RB bundling, a few RBs (e.g., 2, 3, 5, 6, 10, 12, or more) may be bundled as one pre-scheduling unit and scheduling unit. As a consequence, the eNB may assign the bundled RBs to one UE, with the same precoding. For example, for eNB1, the P-RS on RBs 0, 1, 2 may be assigned for UE and one common precoding may be used on these P-RS, and the P-RS on RBs 3, 4, 5 may be assigned for UE2 and one common precoding may be used on these P-RS, and so on. More than one bundle may be assigned to one UE. For eNB2, the P-RS on RBs 0, 1, 2 may be assigned for UE3 and one common precoding may be used on these P-RS, and the P-RS on RBs 3, 4, 5 may be assigned for UE4 and one common precoding may be used on these P-RS, and so on. The bundling for the eNBs may be aligned. The bundling may be known to both the eNBs and their UEs in probing. The UE may assume the interference on each bundle is the same. (At least for each of the dominant interferers performing probing, the precodings on the P-RS in the bundle are the same.) Hence, the UE may estimate the interference (e.g., interference statistics and interference covariance matrices) more accurately on the P-RS on each bundle for better SINR, CQI, and/or MCS estimation. Across the bundles for the UE, the UE may not be able to assume the interference is the same unless notified by the eNB otherwise. The bundling may also help reduce the signaling overhead for probing.

The above example is for pre-scheduling or P-TX. For A-TX, bundling may or may not be used, and if used, the same or different bundling may be used. In any case, the eNBs may need to ensure that the interference (or at least the interference from the dominant interferers) seen by each UE is the same as in the P-TX. For example, if in P-TX, eNB1's UE1 is assigned with RBs 0, 1, and 3 with precoding x, and eNB2's RBs 0, 1, and 3 have precoding A, A, and B, then in the A-TX, eNB1 may assign UE1 with RBs 0, 1, and 3 with precoding x, and eNB2 may assign precoding A, A, and B to RBs 0, 1, and 3. Alternatively, in the A-TX, eNB1 may assign a UE with RBs 0~5 with precoding x, and eNB2 may assign precoding A, A, A, A, B, and B to RBs 0~5 respectively. The latter may require coordination between the eNBs. That is, the eNBs may need to coordinate their resource allocation for the A-TX via the backhaul. If all eNBs keep their resource allocation from P-TX for A-TX, then no coordination may be needed. If A-TX RB bundling is used, the eNB may notify the UEs so that the interference estimation and channel estimation can be more accurate.

In an embodiment, the eNBs may coordinate with one another so that the eNBs transmit the probing signals in the same resources at the same time and so that the eNBs transmit the actual data at the same time after transmitting the probing signals. In particular, the eNBs may need to coordinate on the resources for probing, i.e., setting aside P-RS resources common to all eNBs. Such resources may include the P-RS periodicity, subframe offset, P-RS locations within the subframe, and/or number of maximum layers for the P-RS. Also, if RB bundling is to be used, all eNBs may need to set the same bundling. In addition, if A-TX resource allocation differs from P-TX resource allocation, then resource allocation may need to be coordinated among the eNBs. In some cases, the eNBs may act as peers and exchange coordination information among themselves in a distributed manner. In other cases, one of the eNBs may be elected to act as a coordinator. In yet other cases, some other entity in communication with the eNBs may act as a coordinator.

The use of probing may increase the overhead compared to the cases without probing. To help reduce the overhead for probing, some overhead may be minimized. For example, the overhead due to CRS may be minimized since P-RS is now used for link adaptation. The eNB may signal the legacy UEs that a subframe is a multicast-broadcast single-frequency network (MBSFN) so that CRS needs to appear on the first OFDM symbol and nowhere else. The eNB may configure UEs with dedicated reference signal (DRS)-based measurements and not CRS-based measurements and then CRS may not be transmitted. The eNB may deactivate a carrier for legacy UEs and transmit DRS for new UEs. The eNB may apply fast carrier on/off, and CRS may be transmitted only if the carrier is turned on for data transmission. EPDCCH may be used to replace PDCCH, so that the UE does not need to rely on CRS. However, if EPDCCH is used, there may be a discrepancy between the EPDCCH precoding in the A-TX and the probing precoding in the P-TX. To resolve this issue, EPDCCH precoding may be used in the P-RS as well, or the eNB may ensure that EPDCCH for a UE is transmitted in the RB bundle for the UE. Reducing the CRS can also help improve probing accuracy, as CRS is not precoded and cannot be probed.

Upon receiving the P-TX from its allocated resources, a UE may calculate the received channel quality, e.g. SINR, using the same type of receiver as for later data transmission. If there is difficulty in deriving the received channel quality with specific receivers, e.g. an ML receiver, due to the low density of the P-TX signal, the UE may apply parameters associated with a minimum mean squared error-interference rejection combining (MMSE-IRC) receiver in the calculation. The channel quality results may be used for reporting probing recommendations in different manners. In one manner, the UE may map the channel quality results onto certain CQI values by also taking into account the performance difference between a data demodulation receiver and a probing MMSE-IRC receiver. The network may then adjust the MCS in the A-TX transmission accordingly. In another manner, the network does initial data transmission scheduling. After the UE obtains the channel quality estimation from P-TX transmission, the results are compared with the scheduled transmission conditions. The UE may report to the network the UE's recommended MCS adjustment, e.g., +1 or −1 from the initial scheduled value.

To configure the P-TX transmission, if there are UEs supporting different numbers of layers in the network, the network may need to make sure that the configuration can accommodate the maximum possible layers in A-TX transmission. As an example, two UEs served by two eNBs, supporting 2 and 4 layers of data transmission, are active in the system and are pre-scheduled on the same RBs of the two eNBs of the same subframe. The network may configure 4-port CSI-RS resources for transmitting P-TX to the UE targeting 4-layer data transmission and configure two 2-port CSI-RS resources for transmitting P-TX to the UE targeting 2-layer data transmission. The 2-port CSI-RS resources may completely overlap with the 4-port CSI-RS resources. P-TX signal transmitted in these two 2-port CSI-RS resources may be different but may still have the same precoding or may simply be repeated. In the former case, the UE may or may not need to know the second 2-port CSI-RS resources for probing, but the UE may need to know the second 2-port CSI-RS resources for rate matching. In the latter case, the UE with the two 2-port CSI-RS resources may assume identical signals and precoding are used across the two 2-port CSI-RS resources (if signaled or specified). However, the P-RS on the same subframe of an eNB may have different maximum possible layers in different RBs (or RB bundles, etc.), as long as the P-RS on the same RB across neighboring eNBs have completely overlapping P-RS resources.

Besides a UE reporting recommended CQI or MCS adjustment values, the UE may also be configured to report a recommended transmission rank. Typically, rank is scheduled before the transmission of P-TX and remains the same during P-TX and A-TX. After the processing of P-TX, the UE may find favorable or unfavorable channel conditions for an upcoming A-TX if the same rank is maintained, but the UE may also report to the network its favorite rank. The reported rank may be higher or lower than the original scheduled rank. The rank reporting format may be an absolute rank with an index or an offset from a scheduled rank. For example, a UE may be scheduled for rank 2 transmission and upon deriving the channel quality from P-TX, the UE may report to the network suggesting that the UE prefers rank 1 transmission in the second layer. The network may or may not follow the UE's suggested rank for the transmission of A-TX. If the network does follow the UE's suggestion and changes the rank, some coordination may be needed between the transmitting eNBs.

With the probing signal, the UE has a much better estimation on the actual interference experienced in the data transmission. Therefore, the UE may target a smaller block error rate than normal CSI reporting, which may target average channel and interference conditions, e.g., 2% vs. 10%. In the testing of UE reporting accuracy, a legacy testing methodology and metric may be reused.

Probing-based link adaptation may be applied to a number of scenarios. For example, such adaptation may be used for current LTE systems, with pre-coordination of the probing resources and bundling, with P-TX signaling, and with additional operations to ensure that the A-TX and P-TX are consistent. To help overcome the issue of fewer resources for P-RS interference estimation, RB bundling of a sufficient number of RBs may be used, which implies that probing may be especially effective in a wideband system (e.g., hundreds of RBs within one carrier, which may be the case for C-band, mmWave bands, etc.). The large RB bundle also implies that fewer UEs can be multiplexed in a subframe, but this limitation may not be a problem for a wideband system, especially for mmWave systems, which may have only a few UEs multiplexed. A system with shorter TTI is also more suitable for probing as the delay caused by probing may be reduced. Probing may also be used effectively for wireless backhaul transmissions for similar reasons. Furthermore, probing may significantly help MU-MIMO transmissions, as the paired UEs may estimate their CQI, SINR, and/or MCS more accurately after the pairing. To this aim, the eNB may pair UEs on the common P-RS resources on the P-TX, with precodings to the UEs and with tentative MCS levels for the UEs. Then the UEs may be signaled with their associated sequences, layers, and/or ports and paired layer information (in the case of non-transparent MU-MIMO) and may obtain their probing results. Then the eNB may transmit in the A-TX to the paired UEs with MCS levels updated based on probing. In MU-MIMO probing, the paired UEs in P-TX and A-TX may be consistent. Similarly, probing may be useful for CoMP, and the P-RS signals and their precoding may be from different (virtual) cells.

Probing configuration and configuration signaling from the eNB to the UE may include a number of items. Measurement process configuration may include, for example, a number of regular and/or probing processes and their IDs, antenna ports for the regular and/or probing processes, and/or layers for the regular and/or probing processes. Probing resource configuration may include, for example, P-RS periodicity (which may not be present for aperiodic probing), P-RS subframe offset (which may not be present for aperiodic probing), P-RS RE locations, CSI-RS configurations, antenna ports for the probing processes, and/or layers for the probing processes. Probing signal configuration may include, for example, sequences for serving cells, sequences for interfering cells, layers and/or ports of the serving cell signals and interfering cell signals, and/or MCS levels for the layers and/or ports of the serving cell signals and interfering cell signals. Probing triggering configuration may be based on, for example, pre-scheduling signaling, the associated DCI information, radio network temporary identifier (RNTI), resource allocation types, and/or resource allocation granularity. Probing measurement configuration may include, for example, signal measurement and interference measurement restrictions in time, frequency, antenna ports, and/or layers, including bundling if any. Reporting configuration may include, for example, periodic reporting via PUCCH, aperiodic reporting via PUSCH with associated time/frequency resources, and/or reporting of one or more of MCS, CQI, SINR, recommended RI, bit error rate (BER), block error rate (BLER), frame error rate (FER), log-likelihood ratio (LLR), ACK/NACK, delta MCS, delta CQI, delta SINR, delta rank, etc., for each frequency unit and/or for all specified resources, for each layer. Configuration of possible association of the P-TX and A-TX may include, for example, subframe offset between the P-TX and A-TX, P-TX and A-TX on the same CC or on different CCs (for carrier switching), resource allocation relation between the P-TX and A-TX, and/or quasi-co-location relation between the antenna ports of the P-TX and A-TX.

Probing may help significantly simplify retransmission and hybrid automatic repeat request (HARQ) functions, since the first transmission will often occur successfully. For example, the DCI may be changed such that the New Data Indicator is by default "new data" or is even removed, and the New Data Indicator may be indicated only in the rare event that retransmission is needed. The HARQ process ID may be treated similarly. UE soft buffer management may also be simplified to deal with essentially no retransmission. Complicated HARQ timing may not need to be maintained, especially for TDD systems.

3GPP recently completed a study involving elevated beamforming/full-dimensional MIMO (EBF/FD-MIMO).

The study proposed to utilize the elevation dimension to improve the quality of service for cellular users in urban and/or dense deployment scenarios. One of the features suggested in the study is a beamformed CSI-RS. Benefits of using beamformed reference signals include better support of EBF/FD-MIMO with more antenna ports and improved signal estimation quality owing to beamforming gains.

Figure 14:
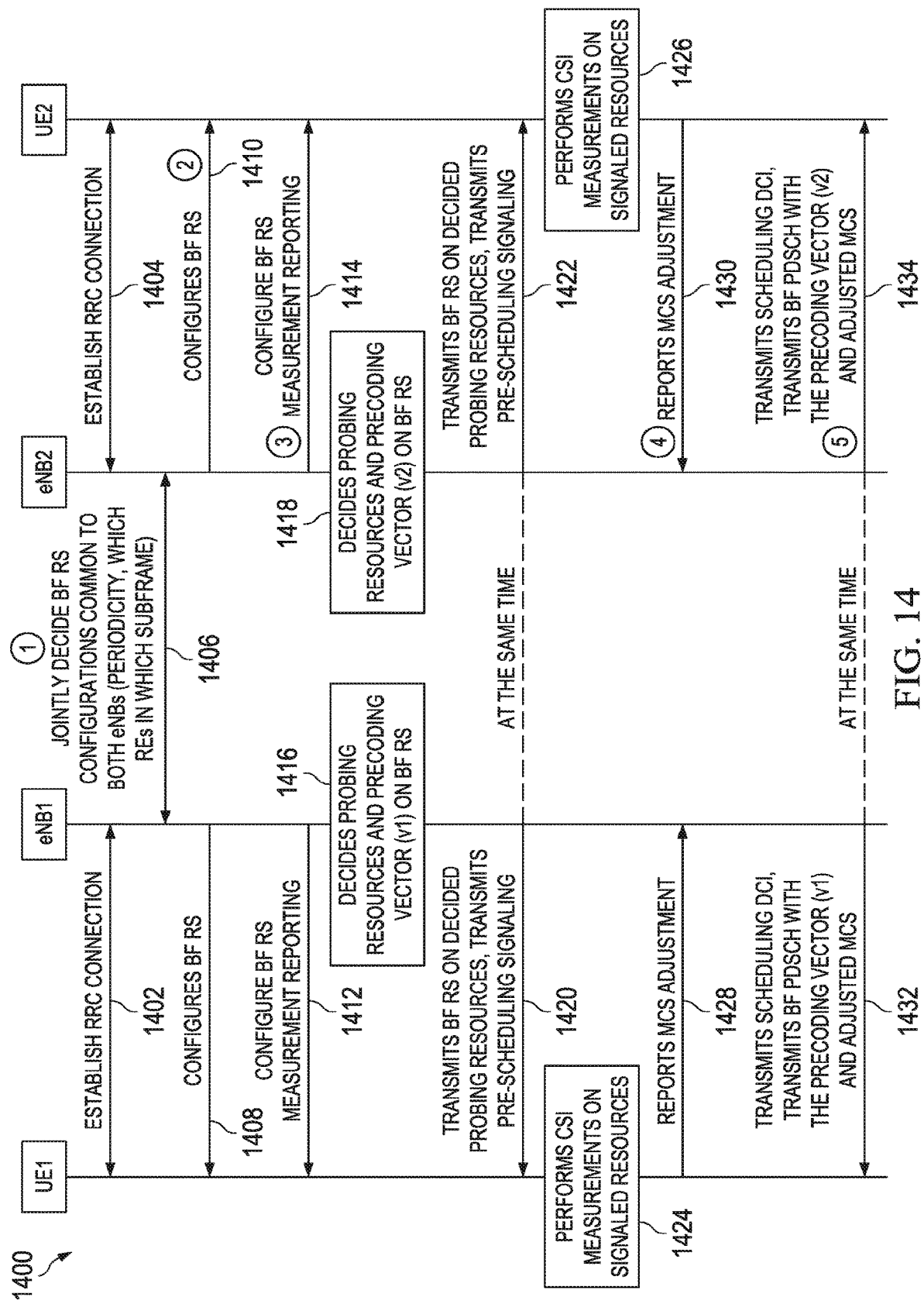
FIG. 14 illustrates an embodiment procedure for probing for link adaptation.

FIG. 14 illustrates an embodiment procedure 1400 for beamforming of reference signals. At event 1402, UE1 and eNB1 establish a radio resource control (RRC) connection, and at event 1404, UE2 and eNB2 establish an RRC connection. At event 1406, eNB1 and eNB2 jointly decide beamforming reference signal configurations common to both eNBs, such as periodicity and which REs are present in which subframes. The circled numerals in FIG. 14 indicate steps for which more details will be provided in FIG. 15. At event 1408, eNB1 configures beamforming reference signals for UE1, and at event 1410, eNB2 configures beamforming reference signals for UE2. At event 1412, eNB1 configures beamforming reference signal measurement reporting for UE1, and at event 1414, eNB2 configures beamforming reference signal measurement reporting for UE2. At event 1416, eNB1 decides on probing resources and a precoding vector (v1) on the beamforming reference signal, and at event 1418, eNB2 decides on probing resources and a precoding vector (v2) on the beamforming reference signal. At event 1420, eNB1 transmits the beamforming reference signal on the decided probing resources and transmits pre-scheduling signaling to UE1, and at event 1422, eNB2 transmits the beamforming reference signal on the decided probing resources and transmits pre-scheduling signaling to UE2. Events 1420 and 1422 may occur at the same time. At event 1424, UE1 performs CSI measurements on the signaled resources, and at event 1426, UE2 performs CSI measurements on the signaled resources. At event 1428, UE1 reports an MCS adjustment to eNB1, and at event 1430, UE2 reports an MCS adjustment to eNB2. At event 1432, eNB1 transmits scheduling DCI and a beamforming PDSCH with the precoding vector v1 and the adjusted MCS to UE1, and at event 1434, eNB2 transmits scheduling DCI and a beamforming PDSCH with the precoding vector v2 and the adjusted MCS to UE2. Events 1432 and 1434 may occur at the same time.

Figure 15:
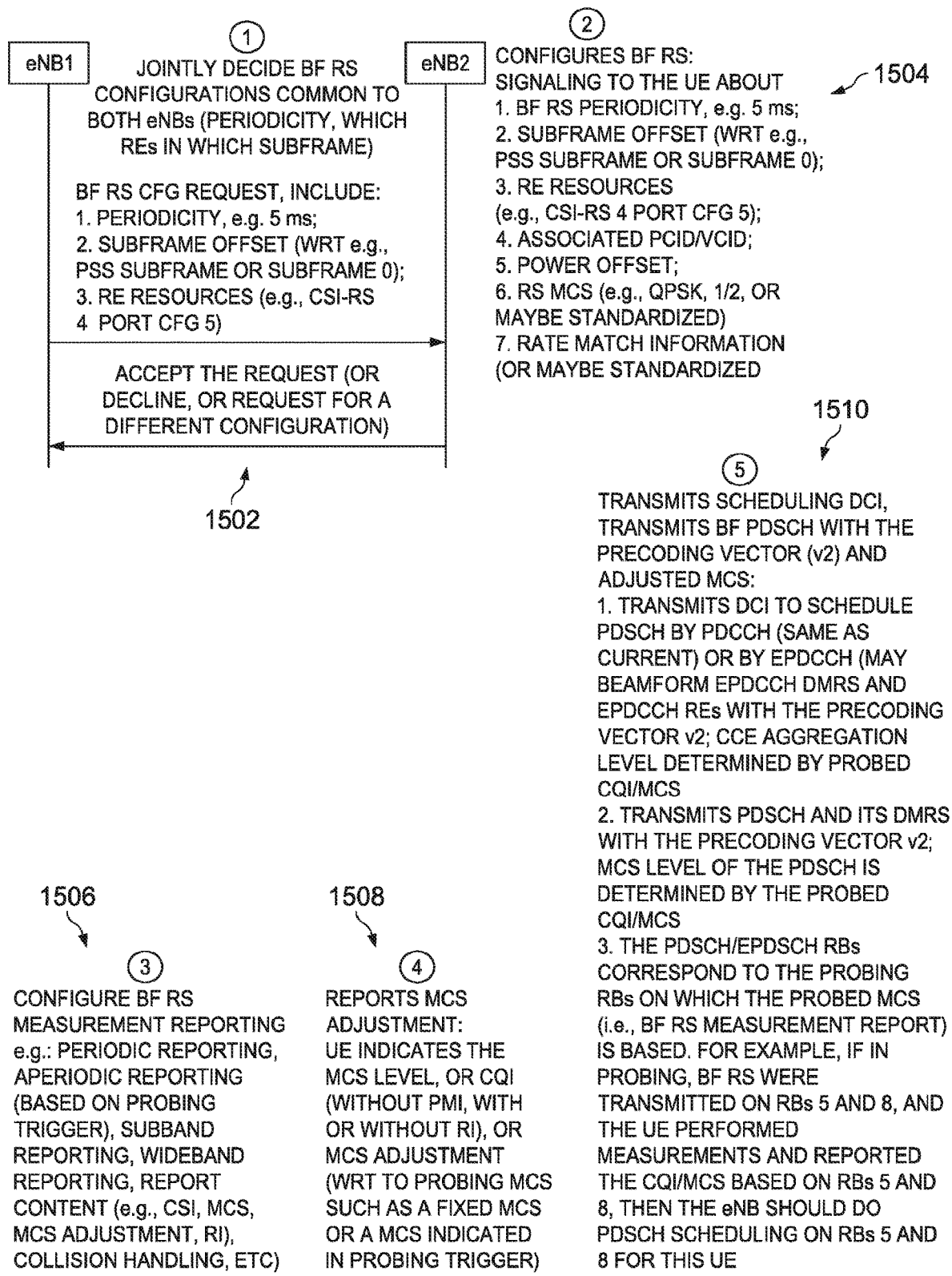
FIG. 15 illustrates details of an embodiment procedure for probing for link adaptation.

FIG. 15 provides details regarding the embodiment procedure 1400 for beamforming of reference signals that was illustrated in FIG. 14. Block 1502 provides details regarding event 1406 in FIG. 14, where eNB1 and eNB2 jointly decide beamforming reference signal configurations common to both eNBs. At that event, eNB1 sends eNB2 a beamforming reference signal configuration request that may include a periodicity, such as 5 ms, a subframe offset with respect to, for example, a PSS subframe or subframe 0, and RE resources. eNB2 then accepts the request, declines the request, or requests a different configuration. Block 1504 provides details regarding event 1410 in FIG. 14, where eNB2 configures beamforming reference signals for UE2. The configuration may include the periodicity, the subframe offset, the RE resources, an associated physical cell ID/virtual cell ID (PCID/VCID), a power offset, a reference signal MCS, and rate matching information. Block 1506 provides details regarding event 1414 in FIG. 14, where eNB2 configures beamforming reference signal measurement reporting. The reporting may be periodic reporting, aperiodic reporting based on a probing trigger, subband reporting, and/or wideband reporting. The configuration may specify report content, such as CSI, MCS, MCS adjustment, and/or RI. The configuration may also specify collision handling procedures. Block 1508 provides details regarding event 1430 in FIG. 14, where UE2 reports an MCS adjustment to eNB2. At that event, UE2 may indicate the MCS level or the CQI (without PMI and with or without RI) or an MCS adjustment with respect to a probing MCS, such as a fixed MCS or an MCS indicated in a probing trigger. Block 1510 provides details regarding event 1434 in FIG. 14, where eNB2 transmits scheduling DCI and a beamforming PDSCH with the precoding vector v2 and the adjusted MCS to UE2. At that event, eNB2 transmits DCI to schedule a PDSCH by a PDCCH or by an EPDCCH. eNB2 may beamform the EPDCCH DMRS and EPDCCH REs with the precoding vector v2. The CCE aggregation level may be determined by a probed CQI/MCS. eNB2 then transmits the PDSCH and its DMRS with the precoding vector v2. The MCS level of the PDSCH is determined by the probed CQI/MCS. The PDSCH/EPDSCH RBs correspond to the probing RBs on which the probed MCS (i.e., the beamforming reference signal measurement report) is based. For example, if in probing, beamforming reference signals were transmitted on RBs 5 and 8, and UE2 performed measurements and reported the CQI/MCS based on RBs 5 and 8, then eNB2 should do PDSCH scheduling on RBs 5 and 8 for UE2.

A CSI process may be configured with class A CSI reporting, class B CSI reporting, or both. In Class A, a UE reports CSI according to W=W1W2 codebook based on {[8],12,16} CSI-RS ports; this is basically the legacy behavior. In Class B, a UE may report L-port CSI, based on, e.g., an indicator for beam selection and L-port CQI/PMI/RI for the selected beam, where the total configured number of ports across all CSI-RS resources in the CSI process is larger than L. Alternatively, the UE may report L-port precoder from a codebook reflecting both beam selection and co-phasing across two polarizations jointly, where the total configured number of ports in the CSI process is L. Alternatively, the UE may report a codebook reflecting beam selection and L-port CSI for the selected beam, where the total configured number of ports across all CSI-RS resources in the CSI process is larger than L. Alternatively, the UE may report L-port CQI/PMI/RI, where the total configured number of ports in the CSI process is L.

Beam selection by a UE constitutes either a selection of a subset of antenna ports within a single CSI-RS resource or a selection of a CSI-RS resource from a set of resources. When a beam is selected and the index associated with the beam is sent by the UE, this may be referred to as beam index (BI) reporting. However, as the beam actually corresponds to a particular CSI-RS resource (or resource configuration), what is seen and selected by the UE is just the CSI-RS resource (or resource configuration) associated with the beam. For this reason, BI may also be referred to as CSI resource indicator (CRI) or the like.

Measurement restrictions for signal/channel measurements and interference measurements (IM) and methods for performing interference measurements in FD-MIMO will now be discussed.

Using interference measurement as an example, different CSI-IM REs (in time and/or frequency, or REs used for interference measurements) may experience different precoding weights. This is especially so as the precoding weights may be UE-specific and vary in time/frequency. An interference measurement based on time-domain and/or frequency-domain interpolation and/or averaging corresponding to different precoding weights may not have any clear physical meaning. A similar issue exists in signal/channel measurement. The eNB may change its beamforming in the time/frequency domains, for different UEs, for UE mobility support, for adaptation of vertical sectors (which may be a special form of virtual sectors, formed by different ways of eNB 2D antenna array analog/digital/hybrid beamforming/steering), etc. Therefore, measurement restriction (MR) may need to be applied in the time and/or frequency domains (independently or dependently), and for signal/channel measurements and interference measurements (independently or dependently).

For a given CSI process, if MR on channel measurement is ON, then the channel used for CSI computation may be estimated from X NZP CSI-RS subframes up to and including a CSI reference resource. Channel measurement is derived from NZP CSI-RS. MR may be based on L1 triggering and/or higher-layer signaling for a dynamic CSI request. For a given CSI process with CSI-IM, if MR on interference measurement is ON, then the interference used for CSI computation may be estimated from Y CSI-IM subframes up to and including a CSI reference resource. Interference measurement is derived from CSI-IM. MR may be based on L1 triggering and/or higher-layer signaling for a dynamic CSI request. If a CSI process can be configured without CSI-IM, for a given CSI process without CSI-IM, if MR on interference measurement is ON, then interference used for CSI computation may be estimated from V subframes up to and including a CSI reference resource.

In a first alternative (Alt1), fixed MR is turned ON or OFF via higher-layer configuration, and X and Y are each fixed to a single value.

In a second alternative (Alt2), configurable MR is turned ON or OFF via higher-layer configuration, and X={OFF, 1, . . . , $N_X$} are higher-layer configurable and Y={OFF, 1, . . . , $N_Y$} are higher-layer configurable.

In a third alternative (Alt3), CSI measurement is periodically reset, where a reset period and a subframe offset are higher-layer configured. X is selected by the UE between 1 and $Z_X$ where $Z_X$ is the number of CSI-RS subframes between the latest measurement reset and the CSI reference resource. Y is selected by the UE between 1 and $Z_Y$ where $Z_Y$ is the number of CSI-IM subframes between the latest measurement reset and the CSI reference resource.

In the above descriptions, X is the number of CSI-RS subframes used for a UE to perform signal/channel measurement averaging/filtering, and Y is the number of subframes used for a UE to perform interference measurement averaging/filtering. If CSI-RS REs are used for IM, the subframes are CSI-RS subframes. If CSI-IM resources are used for IM, the subframes are CSI-IM resource subframes. If CRS REs are used for IM, the subframes are CRS-bearing subframes.

A CSI process is associated with K CSI-RS resources/configurations (per definition in 3GPP TS 36.211), with Nk ports for the kth CSI-RS resource (K could be >=1). For class A and class B and all values of K, MR is independently configurable for each subframe set, when legacy measurement restrictions with two subframe sets are also configured in a CSI process. One RRC parameter for channel measurement (for class B only) and one RRC parameter for interference measurement (for classes A and B) are provided to enable or disable MR. MR may apply to both periodic and aperiodic CSI reporting or only to aperiodic reporting (i.e., with MR never enabled for periodic reporting). For class A and class B with K=1, Alt1 (with X=Y=1) is supported. For class B with K>1, Alt1 (with X=Y=1) or Alt3 may be implemented, with the understanding that existing RRC parameters (e.g., the reset period is equal to the BI period and the offset is fixed) may be reused for Alt3, and consideration of aperiodic reset is also not precluded.

Alt3, where CSI measurement is periodically or aperiodically reset, is now discussed in more detail. FIG. 16 illustrates an example 1600 of Alt3 from the point of view of a UE. Only signal measurement is shown in the figure, but interference measurement may be done similarly. For simplicity, most of the descriptions assume the measurement reset is performed periodically and according to the BI period and reporting. However, the procedures can be easily generalized to cases with aperiodic reset and/or according to some triggering signaling (which may be independent for signal/channel measurement and interference measurement).

A BI period 1602 starts on the subframe 1604 where the UE reports BI and ends on the subframe 1606 where the UE reports BI2. The UE may receive the BI periodicity (or duration, together with subframe offset) information indicated at the subframes 1604 and 1606 where the UE reports BIs. The UE assumes the CSI measurement reset period is equal to the BI period 1602, with potentially an offset 1608 with respect to the BI reporting subframe 1604. The offset 1608 may be specified. A reset period 1610 may be equal to the BI period 1602. The new BI (i.e., BI1) starts to be applied in DL transmission/reception on a subframe 1612 later than the BI1 reporting, and the UE resets its CSI measurement process on this subframe 1612. The UE selects a value X 1614 between 1 and Zx 1616, where Zx 1616 is the number of CSI-RS subframes between the measurement reset subframe 1612 and the reference resource 1618. Two CSI reporting instances 1620 and 1622 are shown. For the first instance 1620, Zx 1616 is smaller, whereas Zx 1616 is larger for the second instance 1622. The same X value 1614 or different X values 1614 may be selected by the UE. BI2 may be applied in DL transmission/reception on a subframe 1624 later than the BI2 reporting.

The benefits of Alt3 include better measurement accuracy, as more averaging is applied to the measurement process of the same characteristic. For example, in a network with time-invariant beamforming (as opposed to time-varying beamforming) within each BI period, the UE can perform averaging across the subframes within each BI period, and this can lead to higher measurement accuracy.

The value of X does not need to be specified in the standards. From the UE's perspective, the UE only needs to know when the reset will be performed and where the reference resources are located. Based on these values, the UE knows Zx, and the UE can flexibly select X accordingly and autonomously. The X value may be the same or different for different Zx, and may be the same or different for different reset periods, etc. In addition, the UE filtering behavior may resemble the legacy filtering behavior (which has no measurement restriction) except for an occasional measurement reset. Therefore, the manner in which filtering is done is a UE implementation issue. That is, no mention of X is needed in the standards, and it is sufficient to capture in the standards that the UE shall reset it measurement process according to the reset timings. This also helps minimize standards impact.

A UE may support at least three types of behavior.

A first behavior involves Alt1 (with X=Y=1), wherein the measurement is restricted based on only one subframe. This alternative is suitable for cases with dynamic beamforming or cases where the UE may not have sufficient knowledge about how or when the serving or interfering eNB beamforming is changing. This alternative provides the highest flexibility for the network to adapt the beamforming while not considerably increasing the signaling overhead.

A second behavior involves Alt3 (measurement reset), wherein the measurement process is reset according to a network indication or triggering, for example by BI reporting. This alternative is suitable for cases with semi-static beamforming or cases where the UE has sufficient knowledge about the subframes on which the beamforming remains constant or cases where longer-term measurement is useful (e.g., in interference measurement for some BI reporting). This alternative may offer higher measurement accuracy than Alt1.

In a third behavior, there is no measurement restriction, i.e., the legacy measurement behavior. This is already supported and used for legacy measurements, such as CSI based on non-precoded CSI-RS.

Therefore, it may be preferable for Alt1, i.e., one subframe measurement restriction (i.e., with X=Y=1), to be supported. Alt3 may also be considered in order to provide more options to the network/UE operations to strike different tradeoffs between flexibility (flexibility to changing beamforming) and measurement accuracy.

To conclude, a UE may support Alt1 (with X=Y=1) and Alt3 (measurement reset) for Class B with K>1. For Alt3 (measurement reset), only the reset event and instant may need to be specified, e.g., BI reporting, and other parameters may be left for UE implementation.

The reset may be tied with the BI reporting, with potentially an offset. The BI reporting may be periodic or aperiodic. In the aperiodic case, the BI reporting may be triggered by signaling in the PHY layer. Signaling may be used for BI reporting triggering only, or BI+RI (as both are long-term measurements), or BI+RI+CQI (there may not be a PMI associated with the CSI process), or BI+RI+CQI+PMI. The trigger may specify which measurement quantities should be reported and which measurement quantities correspond to which BI (old BI or new BI) and/or RI. Alternatively, the trigger may merely specify which CSI processes should be reported, and the associated reporting quantities may be configured via RRC or defined in the standards. Alternatively, the triggering signaling may not be a new signaling, and the existing aperiodic trigger for RI may be reused instead if reporting class B is configured. Alternatively, the reset may be tied to RI reporting, BI and RI reporting, a new triggering signaling not related to BI reporting but used for signal/interference reset purposes, or a combination of these options. The network may configure and support these operations.

The resets for signal measurement and interference measurement may be triggered by the same event or signaling, such as BI reporting. In this case, the eNBs may coordinate their adaptation of the beamforming on the CSI-RS and/or data (or other adaptation such as on/off) so that the eNBs adapt at the same time. If such triggering is regarded as restrictive, separate reset triggers may be used for signal measurement and IM. For example, a UE may be in a sector with an interfering sector changing its precoding every 80 subframes, and the UE's serving sector may be changing its precoding every 240 subframes. In such a case, the signal measurement may reset every 240 ms, but the IM may need to reset every 80 ms. In other words, it is possible that whenever a dominant interferer adapts its transmissions and causes a different interference condition, signaling may be sent from the serving sector to the UE for IM reset.

Between BI reporting and BI application (i.e., the UE measurement reset instant), there may be an offset measured as a number of subframes. This offset is likely to be four subframes, as the eNB may take about four subframes to process and prepare to switch and also considering the timing difference between UL and DL. Alternatively, the offset may be signaled to the UE, such as in RRC signaling for MR configuration, or in the L1 trigger.

If CSI or part of the CSI is triggered to be reported with BI, especially in the K>1 cases, there may not be sufficient time for the UE to generate the CSI measurement results associated with the new BI. One technique that may be adopted to address this issue is to allow a longer latency for BI reporting after the triggering. That is, the UE may wait until after the reset (i.e., BI reporting time+reset offset) and then report CSI associated with the new BI. Another technique that may be adopted to address this issue is for the UE to report CSI associated with the old BI instead of the new one. That is, before the reset, the UE may still base its CSI calculation and reporting on the old BI. For periodic reporting of BI, this issue may be less important, so the UE may be capable of reporting CSI associated with the new BI. However, in order to decrease UE complexity, it may be still desirable to report CSI associated with the old BI until the reset.

Interference measurement will now be considered. Interference measurement approaches include interference measurements with CSI-IM resources (also known as IMR) and interference measurements without CSI-IM resources.

For interference measurements with CSI-IM configured, there can be one or more CSI processes (e.g., CoMP) for a UE, and each CSI process may be configured with CSI-RS and CSI-IM. The associated transmission mode may be TM10 or its further evolution. A CSI process may be associated with one or more CSI-RSs and one or more CSI-IMs. For simplicity, the discussion is mainly directed toward one CSI-RS/CSI-IM per CSI process, but it is not difficult to generalize to cases with multiple CSI-RS/CSI-IM per CSI process. There are two cases when CSI-IM is configured, depending on whether or not the CSI-IM is covered by ZP CSI-RS resources of adjacent eNBs and/or virtual sectors.

Figure 17:
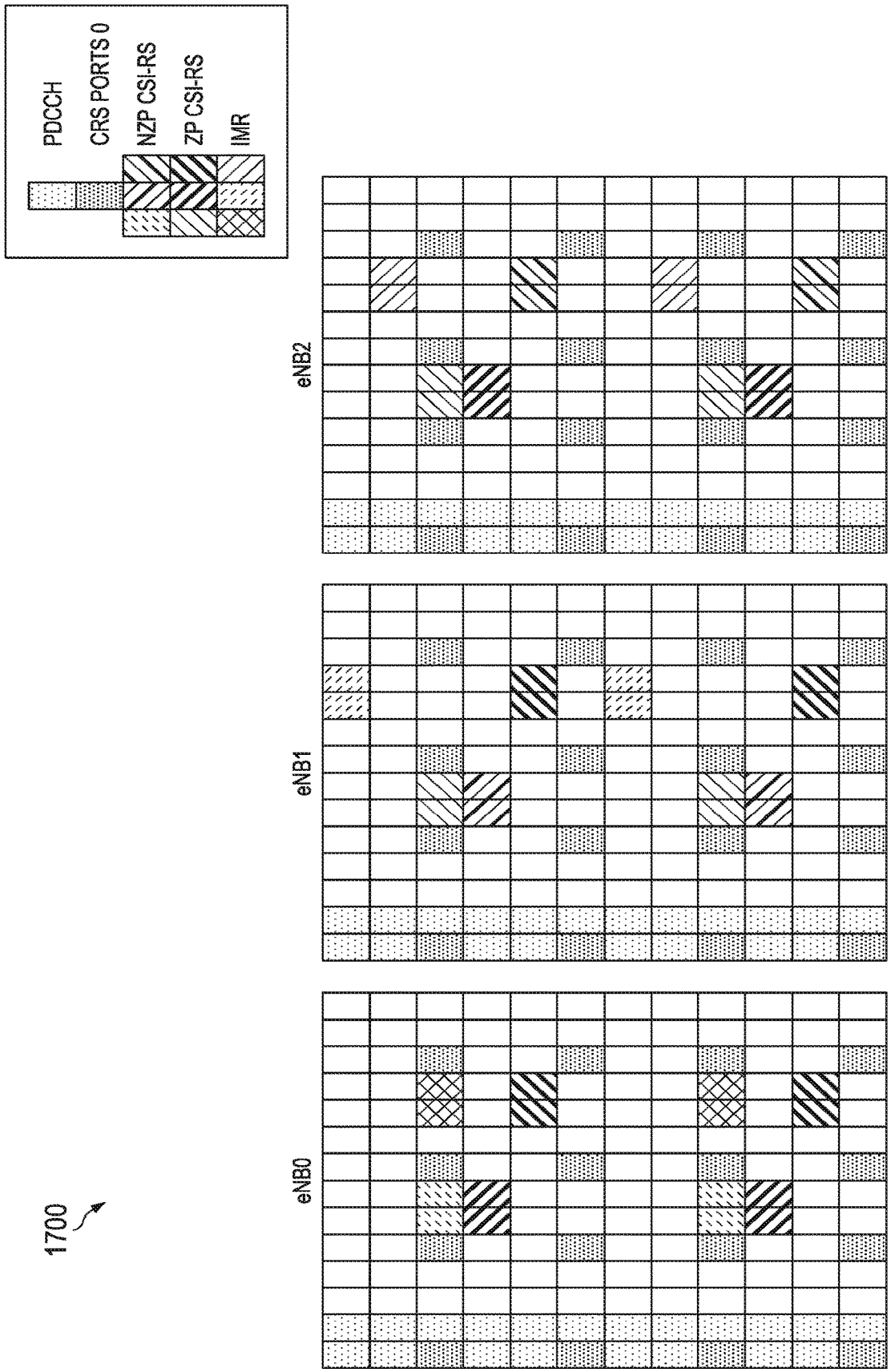
FIG. 17 illustrates an example of resources for CSI measurements with CSI-IM not covered by adjacent eNBs' ZP CSI-RS resources.

FIG. 17 illustrates an example of resources 1700 for CSI measurements in a case where CSI-IM is not covered by ZP CSI-RS resources of adjacent eNBs. For such a case, adjacent eNBs do not configure ZP CSI-RS on the time/frequency resources corresponding to the UE's CSI-IM, and no eNB coordination on CSI-IM REs is required.

The interference perceived on CSI-IM by the UE may be generally the same as the interference perceived on non-CSI-IM REs. Such interference reflects only the current interference being experienced by the UE and does not necessarily reflect the prospective interference the UE will experience, especially if the interfering cells (or virtual sectors) are changing their beamforming and the interference measurement is used for link adaptation in later subframes.

In FIG. 17, there are 16 CSI-RS REs per eNB, that is, 4 REs for signal, 8 REs for muting of adjacent eNB signals, and 4 REs for CSI-IM. In the case of virtual sectors (i.e., each 'eNB' is actually a virtual sector, and the virtual sectors are actually controlled by the same eNB), a UE may need to be configured with all the CSI-RS/CSI-IM and may perform rate matching around them, which amounts to 24 REs in total.

Figure 18:
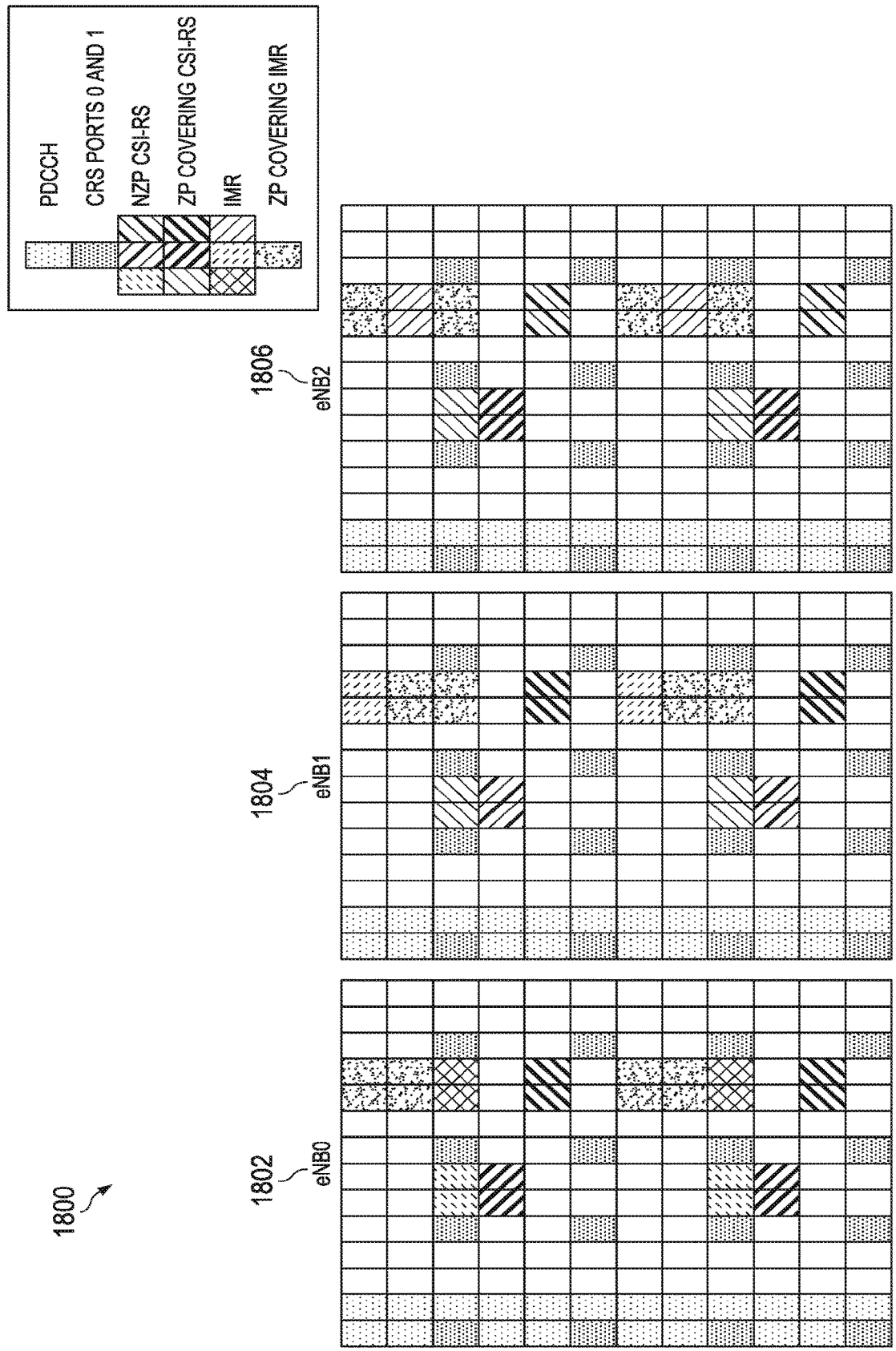
FIG. 18 illustrates an example of resources for CSI measurements with CSI-IM covered by adjacent eNBs' ZP CSI-RS resources.

FIG. 18 illustrates an example of resources 1800 for CSI measurements in a case where CSI-IM is covered by ZP CSI-RS resources of adjacent eNBs. In particular, the CSI-IM of eNB0 1802 overlaps with the ZP CSI-RS of eNB1 1804 and eNB2 1806. The interference measured by eNB0's UE on the CSI-IM is what eNB1 1804 and eNB2 1806 transmit on those ZP CSI-RS, which may not be the same as the PDSCH transmissions from eNB1 1804 and eNB2 1806 and which may generally need to be rate matched by UEs associated with eNB1 1804 and eNB2 1806.

For the case illustrated in FIG. 18, adjacent eNBs may need to configure zero-power CSI-RS on the time/frequency resources corresponding to a UE's CSI-IM, and their transmissions on those resources may need to be consistent with the coordinated transmission hypotheses. As a result, those ZP CSI-RS resources may not be used for data transmissions by the adjacent eNBs (i.e., rate matching may be needed).

It may be noted that ZP CSI-RS does not necessarily mean muting. If it is assumed that the CSI-IM of eNB1 1804 is covered by the ZP CSI-RS of eNB0 1802 and further assumed that eNB0 1802 serves UE0 and eNB1 1804 serves UE1, then from UE0's perspective, UE0 just performs rate matching around the ZP CSI-RS REs. Then eNB0 1802 may mute or transmit signals according to a coordinated hypothesis on the ZP CSI-RS REs, and in the latter case, the signals transmitted by eNB0 1802 are seen by UE1 as interference on the CSI-IM. Therefore, ZP CSI-RS here is a means to provide the eNBs the flexible capability of measuring interference according to a certain transmission hypothesis.

The interference perceived on CSI-IM by the UE may not be directly related to the interference perceived on non-CSI-IM REs (e.g., data REs). Depending on how the eNB coordination is done, such interference may reflect the prospective interference the UE will experience. That is, on an adjacent eNB's ZP CSI-RS, the transmissions may occur according to a transmission hypothesis determined by the network, and the hypothesis may be applied to actual transmissions several subframes later.

In FIG. 18, there are 24 CSI-RS REs per eNB, that is, 4 REs for signal, 8 REs for muting of adjacent eNB signals, 8 REs for transmissions for an adjacent cell UE's interference measurements, and 4 REs for CSI-IM. A UE may need to perform rate matching around at least these 24 REs.

Evolution of TM10 (or potentially a new transmission mode) and/or CSI-IM-based interference measurements may be needed in Release 13 to efficiently support FD-MIMO. In addition, the following enhancement, namely, measurement restriction, may be considered.

If CSI-IM is to be used for a UE operating in EBF/FD-MIMO and the CSI-IM is covered by an adjacent eNB's ZP CSI-RS, different CSI-IM REs (in time and/or frequency) may experience different precoding weights. This is especially so as the precoding weights may be UE-specific and may vary in time/frequency. The interference measurement based on time-domain and/or frequency-domain interpolation and/or averaging corresponding to different precoding weights may not have any clear physical meaning. Therefore, measurement restriction may need to be applied in the time and/or frequency domains. However, if the CSI-IM is not covered by an adjacent eNB's ZP CSI-RS, which is generally associated with no eNB coordination, measurement restriction may not be applicable. Therefore, measurement restriction for interference measurements may be more relevant if the CSI-IM is covered by an adjacent eNB's ZP CSI-RS than if not.

In another approach, interference measurements may not have CSI-IM configured. This approach is applicable to any non-CoMP scenarios, which may be the typical scenarios for FD-MIMO. For this approach, the CSI process is configured with no CSI-IM, and the associated transmission mode may be any other than TM10, such as TM9 or its extension. (3GPP TS 36.213 V12.7.0 R12 (2015 September), which is hereby incorporated herein by reference as if reproduced in full, states in Clause 7.2.1 that, "For a given serving cell, if the UE is configured in transmission modes 1-9, the "CSI process" in Table 7.2.1-1B and Table 7.2.1-1C refers to the aperiodic CSI configured for the UE on the given serving cell." Therefore, TMs 1-9 may be viewed to also have the concept "CSI processes" defined.) The interference measurements may be performed on CSI-RS REs or CRS REs. Performing the interference measurements on CSI-RS REs may be preferred. The following discussion assumes the interference measurements are done on CSI-RS REs.

Figure 19:
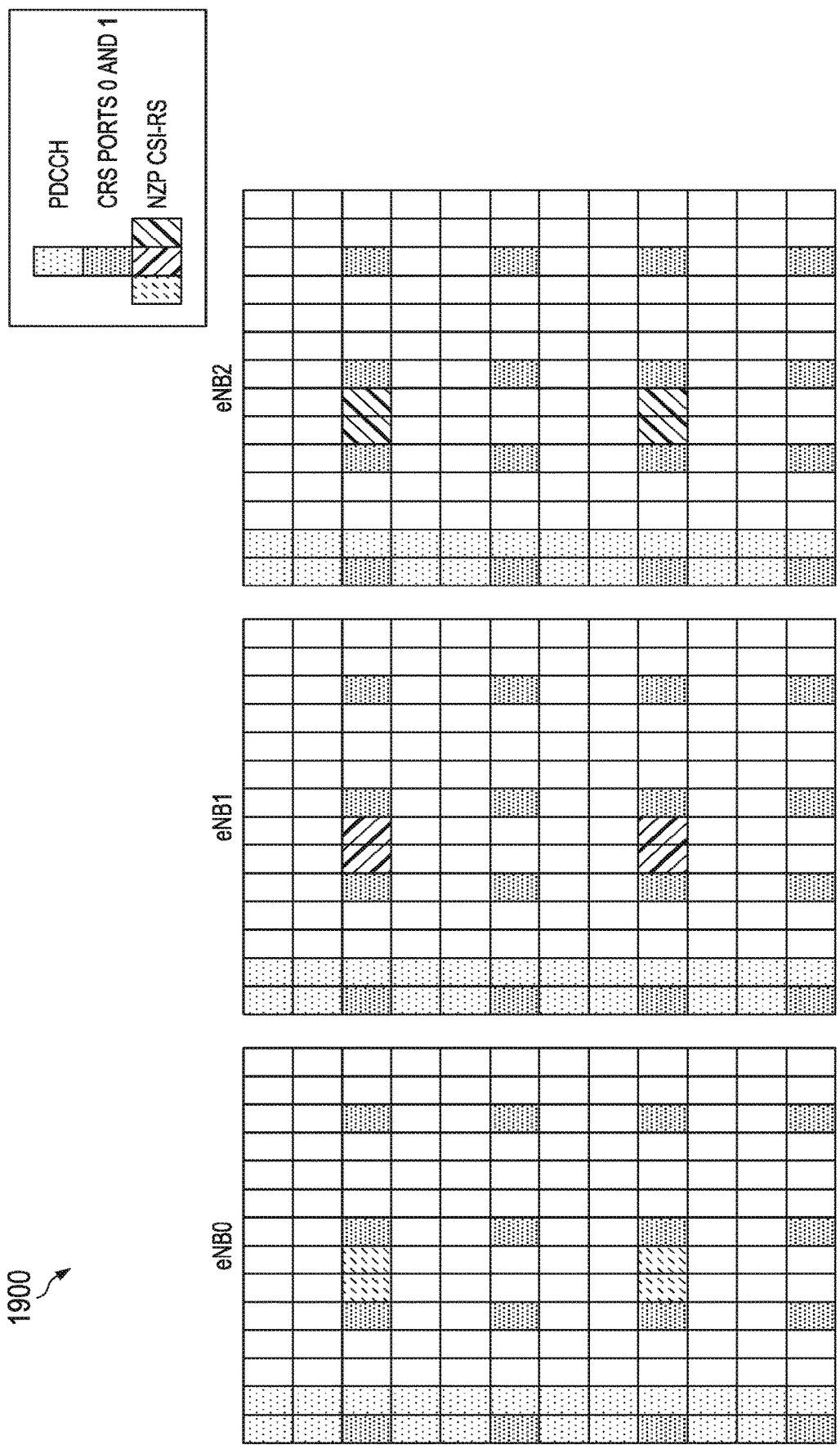
FIG. 19 illustrates CSI measurements without CSI-IM and with overlapping CSI-RS.

FIG. 19 illustrates CSI measurements 1900 without CSI-IM and with overlapping CSI-RS. A UE first detects the signal on the CSI-RS REs then subtracts that signal from the total received signal to obtain an interference estimate. More steps for interference measurements are involved in this case than with CSI-IM; however, such a capability may already be supported by the UE for CRS-based interference measurements. For this example case, the overhead is only four REs (for CSI-RS) per eNB, and the UE performs rate matching around these four REs.

That is, in an embodiment, a plurality of eNBs transmit reference signals on overlapping resource elements. In particular, a plurality of eNBs transmit the probing reference signal or P-RS described herein on resource elements specified for use for NZP CSI-RS. Since the reference signals overlap, a UE can perform measurements of both signal and interference on the same resources. Such a scheme may use less overhead than if separate resource elements are used for signal and interference and may also improve measurement accuracy. Overlapping transmissions from the eNBs may be distinguished from one another by having different scrambling IDs or scrambling sequences.

It is also possible to allow the CSI-RSs to be non-overlapped for the eNBs, but such an approach may not bring any benefit and may capture only the current interference instead of potential future interference (as the precoding weights on the CSI-RSs of an adjacent eNB may be used in later transmissions by the adjacent eNB; hence the precoding weights may be able to reflect potential future interference).

This approach may also allow the CSI process to have multiple CSI-RSs. The interference measurement resources for each CSI-RS are the CSI-RS REs.

It may be thought that the accuracy of interference measurement without CSI-IM may be reduced, mainly due to the need to first estimate and subtract CSI-RS signals (without RE muting) before obtaining the interference estimate. However, analysis may reveal that the measurement accuracy is not an issue.

First, RE muting, when introduced, was primarily applied to measurements of weak signals in CoMP. RE muting is generally not necessary for non-CoMP as the signals are typically sufficiently strong. Second, taking the above example, the number of REs used in interference measurement may be compared to the number of REs when demodulation using DMRS is performed. In the DMRS case, there are 12 REs per RB. In the above example, there are 4 REs per RB. However, with proper interpolation/averaging and measurement restriction (e.g., 3 or 6 RBs per feedback granularity), generally the CSI-RS REs from multiple RBs may be used. In this way, the accuracy of CSI-RS measurements may at least match the accuracy required for demodulation, although sufficient measurement accuracy may be achieved at the cost of more operations in interference measurements. Additionally, the accuracy might be increased further due to beamforming gain since CSI-RS are precoded in EBF/FD-MIMO. Therefore, the measurement accuracy without CSI-IM may not be a concern.

Similar to CSI-IM-based interference measurements, it may also be important to introduce proper measurement restriction in the time/frequency domain for non-CSI-IM-based interference measurements. Therefore, CSI-RS REs may be used for interference measurements with sufficient measurement accuracy, and the interference measurements performed on CSI-RS REs may be enhanced by measurement restriction.

Table 1 compares the three interference measurement mechanisms discussed above.

TABLE 1

| | IM resource | Measured interference | Overhead | Require coordination | Require MR |
|---|---|---|---|---|---|
| A: CSI-IM not covered by adjacent eNB's ZP CSI-RS | CSI-IM REs | Present interference | Medium/ high | No | Not applicable |
| B: CSI-IM covered by adjacent eNB's ZP CSI-RS | CSI-IM REs | Prospective interference | High | Yes | Yes |
| C: No CSI-IM | CSI-RS REs | Prospective interference | Low | No | Yes |

It may be seen that mechanism C may be the best choice for FD-MIMO.

It may be noted that mechanism B may cover mechanism C if the CSI-IM is allowed to overlap with the CSI-RS, with proper UE behavior clarified. More specifically, the following potentially unifying solution may be adopted.

First, the UE is configured with a NZP CSI-RS. The UE may be further configured with a CSI-IM that overlaps with the CSI-RS (for, e.g., TM10 or its evolution), or with no CSI-IM (for, e.g., TM9 or its evolution). Second, the UE performs signal/channel measurements based on the NZP CSI-RS. Third, the UE cancels NZP CSI-RS on the NZP CSI-RS REs, such that only interference is left on those REs. Fourth, the UE performs interference measurements on those REs.

Therefore, by allowing interference measurement on the NZP CSI-RS REs and adopting the above UE behavior, the benefits associated with mechanism C may also be achieved by mechanism B. In such a case, the UE behavior in mechanisms B and C becomes the same, which may simplify the standardization effort. If multiple NZP CSI-RS are configured on overlapped REs (for example, for multiple virtual sectors), then the UE may need to perform the second and third steps above for each NZP CSI-RS. For example, if the UE is configured with three NZP CSI-RS associated with three different virtual sectors on the same REs, the UE can detect each of the three NZP CSI-RS for signal/channel measurements and obtain three transmissions, S1, S2, and S3 (pre- or post-receiver combining). Then the UE subtracts the first NZP CSI-RS signal from the received signal on the REs, obtaining the interference estimation I1 associated with S1 transmission. The ratio of S1 and I1 plus noise (with proper combining applied, if any, and in the power domain) is then the SINR associated with S1 transmission. Other SINRs may be obtained similarly. Also, other measurement quantities including, but not limited to, CQI, CSI, PMI, RI, BI, and RRM measurements may be obtained.

To conclude, NZP CSI-RS REs may be used for interference measurements. The UE behavior may need to be clarified in such a case. These concepts may apply to two cases: TM10 or its evolution, with a CSI-IM that overlaps with the CSI-RS, and TM9 or its evolution, with no CSI-IM configured.

An embodiment method for downlink signaling in a wireless network includes signaling to a UE an index of a CSI-IM resource, CSI-RS resource, or CQI report/CSI process, together with a timing and/or a time period, wherein the UE measures and feeds back based on the resources associated with the indexes and timing, the UE assumes a new measurement condition for the indicated CSI-IM resource, CSI-RS resource, or CQI report/CSI process will be in effect since the indicated timing and/or according to the indicated time period, and the eNB adapts its transmissions (e.g., precoding, muting or non-muting) based on the indicated CSI-IM resource and/or CSI-RS resource only according to the indicated timing and/or timing period.

An embodiment method for backhaul signaling in a wireless network includes signaling to a second eNB of a CSI-IM resource and/or CSI-RS resource, together with the same timing and/or a time period, wherein the second eNB sends a DL signaling to a UE.

An embodiment method for backhaul signaling in a wireless network includes signaling to an eNB of an CSI-IM resource and/or CSI-RS resource, together with a timing, wherein a plurality of eNBs adapt their PDSCH transmissions (e.g., precoding, muting or non-muting) according to the transmissions on the indicated CSI-IM resource and/or CSI-RS resource at the indicated timing, and the eNBs signal UEs to stop the measurements and feedback according to the timing. In any case, if the timings are signaled, the timings may be signaled only once at the beginning of the probing process (e.g., a sequence of timings of t0, t1, . . . , tk with a predetermined k), or signaled over time when needed.

In an embodiment method, the timing exchanged by eNBs and/or the timing exchanged between the eNBs and UEs are not present. This embodiment has the benefit of less signaling overhead. However, the probing may become more lengthy in time and more likely to fluctuate. On the other hand, the timing may be either predefined or partially predefined so that either no signaling about timing or a simplified signaling about timing may be used. Thus the signaling overhead may be reduced.

A method for adaptation in a wireless network includes a first base station signaling information of a first resource set to a first UE and/or a second base station, and the second base station signaling information of a second resource set to a second UE and receiving feedback from the first and second UEs for the resource sets. The method includes the first base station signaling a first timing to the first UE and/or the second base station, and the second base station signaling the first timing to the second UE and receiving feedback from the first and second UEs about the resource sets according to the first timing. The method further includes the first base station transmitting a first signal on a first subset of the first resource set according to the first timing, and the second base station transmitting a second signal on a second subset of the second resource set according to the first timing and receiving feedback from the first UE about the transmitted first signal, the first resource set, and the first timing. The method further includes the first base station transmitting a third signal on a third subset of the first resource set according to the first timing, the second base station transmitting a fourth signal on a fourth subset of the second resource set according to the first timing, the first base station signaling a second timing to the first UE or the second base station, and the second base station signaling the second timing to the second UE and receiving feedback from the UEs according to the second timing after the UEs stop measurements.

A method for downlink signaling in a wireless network includes a UE receiving from a base station signaling of an index of a CSI-IM resource, a CSI-RS resource, a CQI report, or a CSI process, together with a timing. The method further includes measuring and sending feedback to the base station in accordance with the indexed resource and the timing, assuming a new measurement condition for the indexed resource will be in effect according to the timing, and receiving adapted transmissions from the base station on the indexed CSI-IM resource and/or CSI-RS resource only according to the timing.

FIG. 20 illustrates a block diagram of an embodiment processing system 2000 for performing methods described herein, which may be installed in a host device. As shown, the processing system 2000 includes a processor 2004, a memory 2006, and interfaces 2010-2014, which may (or may not) be arranged as shown in the figure. The processor 2004 may be any component or collection of components adapted to perform computations and/or other processing related tasks, and the memory 2006 may be any component or collection of components adapted to store programming and/or instructions for execution by the processor 2004. In an embodiment, the memory 2006 includes a non-transitory computer readable medium. The interfaces 2010, 2012, 2014 may be any component or collection of components that allow the processing system 2000 to communicate with other devices/components and/or a user. For example, one or more of the interfaces 2010, 2012, 2014 may be adapted to communicate data, control, or management messages from the processor 2004 to applications installed on the host device and/or a remote device. As another example, one or more of the interfaces 2010, 2012, 2014 may be adapted to allow a user or user device (e.g., personal computer (PC), etc.) to interact/communicate with the processing system 2000. The processing system 2000 may include additional components not depicted in the figure, such as long term storage (e.g., non-volatile memory, etc.).

In some embodiments, the processing system 2000 is included in a network device that is accessing, or part otherwise of, a telecommunications network. In one example, the processing system 2000 is in a network-side device in a wireless or wireline telecommunications network, such as a base station, a relay station, a scheduler, a controller, a gateway, a router, an applications server, or any other device in the telecommunications network. In other embodiments, the processing system 2000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 2010, 2012, 2014 connects the processing system 2000 to a transceiver adapted to transmit and receive signaling over the telecommunications network. FIG. 21 illustrates a block diagram of a transceiver 2100 adapted to transmit and receive signaling over a telecommunications network. The transceiver 2100 may be installed in a host device. As shown, the transceiver 2100 comprises a network-side interface 2102, a coupler 2104, a transmitter 2106, a receiver 2108, a signal processor 2110, and a device-side interface 2112. The network-side interface 2102 may include any component or collection of components adapted to transmit or receive signaling over a wireless or wireline telecommunications network. The coupler 2104 may include any component or collection of components adapted to facilitate bi-directional communication over the network-side interface 2102. The transmitter 2106 may include any component or collection of components (e.g., up-converter, power amplifier, etc.) adapted to convert a baseband signal into a modulated carrier signal suitable for transmission over the network-side interface 2102. The receiver 2108 may include any component or collection of components (e.g., down-converter, low noise amplifier, etc.) adapted to convert a carrier signal received over the network-side interface 2102 into a baseband signal. The signal processor 2110 may include any component or collection of components adapted to convert a baseband signal into a data signal suitable for communication over the device-side interface(s) 2112, or vice-versa. The device-side interface(s) 2112 may include any component or collection of components adapted to communicate data-signals between the signal processor 2110 and components within the host device (e.g., the processing system 2000, local area network (LAN) ports, etc.).

The transceiver 2100 may transmit and receive signaling over any type of communications medium. In some embodiments, the transceiver 2100 transmits and receives signaling over a wireless medium. For example, the transceiver 2100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2102 comprises one or more antenna/radiating elements. For example, the network-side interface 2102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an indicating unit/module, a measuring unit/module and/or a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

An embodiment method for wireless communications includes sending, by a user equipment (UE), a channel state information (CSI) report to a network device. The CSI report includes a channel measurement associated with a first subset of a set of non-zero-power (NZP) CSI reference signal (CSI-RS) (NZP CSI-RS) resources and an interference measurement associated with at least one of a set of resources configured for interference measurement for the CSI report and the first subset of the set of NZP CSI-RS resources. In one example, the CSI report includes a channel quality indicator (CQI) but not a precoding matrix indicator (PMI). In the same example, or in another example, the set of resources configured for interference measurement include at least a set of CSI interference measurement (CSI-IM) resources. In any one of the abovementioned examples, or in a new example, the method further includes receiving, by the UE, a configuration of measurement restriction associated with the channel measurement. In any one of the abovementioned examples, or in a new example, the method further includes receiving a configuration of measurement restriction associated with interference measurement. In any one of the abovementioned examples, or in a new example, the method further includes receiving, by the UE, a downlink control information (DCI) message indicating the first subset of the NZP CSI-RS resources. In any one of the abovementioned examples, or in a new example, the method further includes receiving, by the UE, a downlink control information (DCI) message indicating the set of resources configured for interference measurement for the CSI report. In any one of the abovementioned examples, or in a new example, the CSI report is associated with a designation of a rank associated with the first subset of the NZP CSI-RS resources, and the rank is for a number of layers/ports associated with the first subset of the NZP CSI-RS resources. In any one of the abovementioned examples, or in a new example, the CSI report is associated with a rank indicator (RI) report with a rank, and the rank is equal to a number of selected layers/ports within the first subset of the NZP CSI-RS resources. In any one of the abovementioned examples, or in a new example, the CSI report is associated with a designation of an uplink channel on which the UE is to transmit the report. In any one of the abovementioned examples, or in a new example, the CSI report is associated with a designation of an amount of bundling of RBs to be used by the network device to transmit a first reference signal (RS) on the first subset of the NZP CSI-RS resources. In any one of the abovementioned examples, or in a new example, a signaling for the interference measurement includes at least one of a sequence and layers/ports for interference measurement by the UE. In such an example, at least one of a sequence and layers/ports for interference measurement by the UE corresponds to a second subset of a set of NZP CSI-RS resources specified for a second UE for channel measurement.

An embodiment method for wireless communications includes receiving, by a network device, a channel state information (CSI) report to a user equipment (UE). The CSI report includes a channel measurement associated with a first subset of a set of non-zero-power (NZP) CSI reference signal (CSI-RS) (NZP CSI-RS) resources and an interference measurement associated with at least one of a set of resources configured for interference measurement for the CSI report and the first subset of the set of NZP CSI-RS resources. In one example, the CSI report includes a channel quality indicator (CQI) but not a precoding matrix indicator (PMI). In the same example, or in another example, the set of resources configured for interference measurement include at least a set of CSI interference measurement (CSI-IM) resources. In any one of the abovementioned examples, or in a new example, the method further includes transmitting, by the network device, a configuration of measurement restriction associated with the channel measurement to the UE. In any one of the abovementioned examples, or in a new example, the method further includes transmitting, by the network device, a configuration of measurement restriction associated with interference measurement to the UE. In any one of the abovementioned examples, or in a new example, the method further includes transmitting, by the network device, a downlink control information (DCI) message to the UE that indicates the first subset of the NZP CSI-RS resources. In any one of the abovementioned examples, or in a new example, the method further includes transmitting, by the network device, a downlink control information (DCI) message to the UE that indicates the set of resources configured for interference measurement for the CSI report. In any one of the abovementioned examples, or in a new example, the CSI report is associated with a designation of a rank associated with the first subset of the NZP CSI-RS resources, and the rank is for a number of layers/ports associated with the first subset of the NZP CSI-RS resources. In any one of the abovementioned examples, or in a new example, the CSI report is associated with a rank indicator (RI) report with a rank, and the rank is equal to a number of selected layers/ports within the first subset of the NZP CSI-RS resources. In any one of the abovementioned examples, or in a new example, the CSI report is associated with a designation of an uplink channel on which the UE is to transmit the report. In any one of the abovementioned examples, or in a new example, the CSI report is associated with a designation of an amount of bundling of RBs to be used by the network device to transmit a first reference signal (RS) on the first subset of the NZP CSI-RS resources. In any one of the abovementioned examples, or in a new example, a signaling for the interference measurement includes at least one of a sequence and layers/ports for interference measurement by the UE. In such an example, at least one of a sequence and layers/ports for interference measurement by the UE corresponds to a second subset of a set of NZP CSI-RS resources specified for a second UE for channel measurement.

For example, the various elements or components may be combined or integrated in another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for wireless communications, the method comprising:
   receiving, by a user equipment (UE), reference signal(s) on first non-zero-power (NZP) CSI reference signal (CSI-RS) (NZP CSI-RS) resource(s); and
   transmitting, by the UE, a report to a network device, the report including a channel quality indicator (CQI), the CQI based on (1) a channel measurement and (2) an interference measurement for the report, wherein the channel measurement is on the first NZP CSI-RS resource(s), and wherein the interference measurement is on at least one of:
the first NZP CSI-RS resource(s), or
NZP resource(s) configured for interference measurements.

2. The method of claim 1, wherein the report comprises the CQI, a CSI resource indicator (CRI), and a rank indicator (RI).

3. The method of claim 1, wherein the interference measurement is on at least the NZP resource(s) configured for the interference measurements, and wherein the interference measurement is further on CSI interference measurement (CSI-IM) resource(s).

4. The method of claim 1, wherein the interference measurement is on at least the NZP resource(s) configured for the interference measurements, and wherein the NZP resource(s) configured for the interference measurements include second NZP CSI-RS resource(s) that are different than the first NZP CSI-RS resource(s).

5. The method of claim 1, further comprising:
receiving, by the UE, a configuration of measurement restriction associated with the channel measurement or the interference measurement.

6. The method of claim 1, further comprising:
receiving, by the UE, a downlink control information (DCI) message indicating that the first NZP CSI-RS resource(s) and the NZP resource(s) configured for the interference measurements for CSI report(s) are associated with a CSI report configuration for the CSI report(s).

7. The method of claim 2, wherein the RI indicates a rank for a number of layers/ports associated with the first NZP CSI-RS resource(s).

8. The method of claim 2, wherein the RI indicates a rank equal to a number of selected layers/ports within the first NZP CSI-RS resource(s).

9. The method of claim 1, wherein the first NZP CSI-RS resource(s) consist of a single NZP CSI-RS resource.

10. The method of claim 1, wherein first NZP CSI-RS resource(s) include multiple NZP CSI-RS resources.

11. A user equipment (UE) comprising:
at least one processor; and
a non-transitory computer readable storage medium storing programming for execution by the at least one processor, the programming including instructions to:
receive reference signal(s) on first non-zero-power (NZP) CSI reference signal (CSI-RS) (NZP CSI-RS) resource(s); and
transmit a report to a network device, the report including a channel quality indicator (CQI), the CQI based on (1) a channel measurement and (2) an interference measurement for the report, wherein the channel measurement is on the first NZP CSI-RS resource(s), and wherein the interference measurement is on at least one of:
the first NZP CSI-RS resource(s), or
NZP resource(s) configured for interference measurements.

12. A method for wireless communications, the method comprising:
transmitting, by a network device to a user equipment (UE), reference signals on first non-zero-power (NZP) CSI reference signal (CSI-RS) (NZP CSI-RS) resource(s); and receiving, by the network device, a report from the UE, the report including a channel quality indicator (CQI), the CQI based on (1) a channel measurement and (2) an interference measurement for the report, wherein the channel measurement is on the first NZP CSI-RS resource(s), and wherein the interference measurement is on at least one of:
the first NZP CSI-RS resource(s), or
NZP resource(s) configured for interference measurements.

13. A network device comprising:
at least one processor; and
a non-transitory computer readable storage medium storing programming for execution by the at least one processor, the programming including instructions to:
transmit, to a user equipment (UE), reference signals on first non-zero-power (NZP) CSI reference signal (CSI-RS) (NZP CSI-RS) resource(s); and
receive a report from the UE, the report including a channel quality indicator (CQI), the CQI based on (1) a channel measurement and (2) an interference measurement for the report, wherein the channel measurement is on the first NZP CSI-RS resource(s), and wherein the interference measurement is on at least one of:
the first NZP CSI-RS resource(s), or
NZP resource(s) configured for interference measurements.

14. A method for wireless communications, the method comprising:
receiving, by a user equipment (UE), reference signals on first non-zero-power (NZP) CSI reference signal (CSI-RS) (NZP CSI-RS) resource(s); and
transmitting, by the UE, a report to a network device, the report including a signal-to-interference-plus-noise ratio (SINR), the SINR based on (1) a channel measurement and (2) an interference measurement for the report, wherein the channel measurement is on the first NZP CSI-RS resource(s), and wherein the interference measurement is on at least one of:
second NZP CSI-RS resource(s), or
NZP resource(s) configured for interference measurements.

15. The method of claim 14, wherein the interference measurement is on the NZP resource(s) configured for the interference measurements, and wherein the interference measurement is further on CSI interference measurement (CSI-IM) resource(s).

16. A user equipment (UE) comprising:
at least one processor; and
a non-transitory computer readable storage medium storing programming for execution by the at least one processor, the programming including instructions to:
receive reference signals on a first set of non-zero-power (NZP) CSI reference signal (CSI-RS) (NZP CSI-RS) resources; and
transmit a report to a network device, the report including a signal-to-interference-plus-noise ratio (SINR), the SINR based on (1) a channel measurement and (2) an interference measurement for the report, wherein the channel measurement is on the first set of NZP CSI-RS resources, and wherein the interference measurement is on at least one of:
a second set of NZP CSI-RS resources, or
a set of NZP resources configured for interference measurements for the report.

17. A method for wireless communications, the method comprising:
- transmitting, by a network device to a user equipment (UE), reference signals on first non-zero-power (NZP) CSI reference signal (CSI-RS) (NZP CSI-RS) resource(s); and
- receiving, by the network device, a report from the UE, the report including a signal-to-interference-plus-noise ratio (SINR), the SINR based on (1) a channel measurement and (2) an interference measurement for the report, wherein the channel measurement is on the first NZP CSI-RS resource(s), and wherein the interference measurement is on at least one of:
  - second NZP CSI-RS resource(s), or
  - NZP resource(s) configured for interference measurements.

18. A network device comprising:
- at least one processor; and
- a non-transitory computer readable storage medium storing programming for execution by the at least one processor, the programming including instructions to:
  - transmit, to a user equipment (UE), reference signals on first non-zero-power (NZP) CSI reference signal (CSI-RS) (NZP CSI-RS) resource(s); and
  - receive a report from the UE, the report including a signal-to-interference-plus-noise ratio (SINR), the SINR based on (1) a channel measurement and (2) an interference measurement for the report, wherein the channel measurement is on the first NZP CSI-RS resource(s), and wherein the interference measurement is on at least one of:
    - second NZP CSI-RS resource(s), or
    - NZP resource(s) configured for interference measurements for.

19. The UE of claim 11, wherein the report comprises the CQI, a CSI resource indicator (CRI), and a rank indicator (RI).

20. The network device of claim 13, wherein the report comprises the CQI, a CSI resource indicator (CRI), and a rank indicator (RI).

* * * * *

UNITED STATES PATENT AND TRADEMARK OFFICE
CERTIFICATE OF CORRECTION

PATENT NO. : 11,689,328 B2
APPLICATION NO. : 17/006420
DATED : June 27, 2023
INVENTOR(S) : Liu et al.

Page 1 of 1

It is certified that error appears in the above-identified patent and that said Letters Patent is hereby corrected as shown below:

In the Specification

In Column 22, Line 15, delete "TIs" and insert -- TTIs --, therefor.

In Column 25, Line 29, delete "UE" and insert -- UE1 --, therefor.

In Column 32, Line 15, delete "BI" and insert -- BI1 --, therefor.

In the Claims

In Column 46, in Claim 18, Lines 13-14, delete "measurements for." and insert -- measurements. --, therefor.

Signed and Sealed this
Fifth Day of September, 2023

Katherine Kelly Vidal
*Director of the United States Patent and Trademark Office*